(12) United States Patent
Miyashita et al.

(10) Patent No.: US 11,841,528 B2
(45) Date of Patent: Dec. 12, 2023

(54) LINEAR LIGHT-EMITTING DEVICE

(71) Applicants: CITIZEN ELECTRONICS CO., LTD., Fujiyoshida (JP); CITIZEN WATCH CO., LTD., Tokyo (JP)

(72) Inventors: Takumi Miyashita, Fujiyoshida (JP); Ryo Tamura, Yamanashi (JP); Takahiro Shimizu, Fujiyoshida (JP); Takuma Horiuchi, Otsuki (JP); Ryo Matsuura, Yamanashi (JP)

(73) Assignees: Citizen Electronics Co., Ltd., Fujiyoshida (JP); Citizen Watch Co., Ltd., Nishitokyo (JP)

( * ) Notice: Subject to any disclaimer, the term of this patent is extended or adjusted under 35 U.S.C. 154(b) by 0 days.

(21) Appl. No.: 17/622,681

(22) PCT Filed: Jun. 25, 2020

(86) PCT No.: PCT/JP2020/025088
§ 371 (c)(1),
(2) Date: Dec. 23, 2021

(87) PCT Pub. No.: WO2020/262552
PCT Pub. Date: Dec. 30, 2020

(65) Prior Publication Data
US 2022/0252777 A1     Aug. 11, 2022

(30) Foreign Application Priority Data
Jun. 25, 2019   (JP) .................................. 2019-117746

(51) Int. Cl.
*F21V 8/00*     (2006.01)

(52) U.S. Cl.
CPC ........... *G02B 6/009* (2013.01); *G02B 6/0068* (2013.01)

(58) Field of Classification Search
CPC ............................... G02B 6/009; G02B 6/0068
See application file for complete search history.

(56) References Cited

U.S. PATENT DOCUMENTS

| 11,067,228 B2 | 7/2021 | Takakusaki |
| 2007/0133222 A1 | 6/2007 | Watanabe et al. |

(Continued)

FOREIGN PATENT DOCUMENTS

| JP | 2007163620 A | 6/2007 |
| JP | 2009260174 A | 11/2009 |

(Continued)

OTHER PUBLICATIONS

International Search Report dated Apr. 8, 2020 from International Application No. PCT/JP2020/025088, 3 pages.

(Continued)

*Primary Examiner* — Mary Ellen Bowman
(74) *Attorney, Agent, or Firm* — Procopio, Cory, Hargreaves & Savitch LLP

(57) ABSTRACT

A linear light-emitting device including a substrate extending while being curved in a predetermined direction, a plurality of light-emitting elements arranged on the substrate in a predetermined direction, and a seal for sealing the plurality of light-emitting elements, wherein a luminance of a specific part of the substrate is higher than that of the other parts of the substrate.

15 Claims, 18 Drawing Sheets

(56) References Cited

U.S. PATENT DOCUMENTS

| | | | | |
|---|---|---|---|---|
| 2012/0293729 A1* | 11/2012 | Yoshikawa | .......... | G02B 6/0068 |
| | | | | 362/249.02 |
| 2014/0368767 A1* | 12/2014 | Sugawara | ............ | G02B 6/0031 |
| | | | | 362/609 |
| 2018/0067252 A1* | 3/2018 | Edamitsu | ............... | G02B 6/005 |

FOREIGN PATENT DOCUMENTS

| | | |
|---|---|---|
| JP | 2011119180 A | 6/2011 |
| JP | 2012119436 A | 6/2012 |
| JP | 2015002090 A | 1/2015 |
| JP | 6498258 B | 3/2019 |
| WO | 2011096246 A1 | 8/2011 |

OTHER PUBLICATIONS

International Preliminary Report on Patentability completed on Apr. 15, 2021 from International Application No. PCT/JP2020/025088, 5 pages.

* cited by examiner

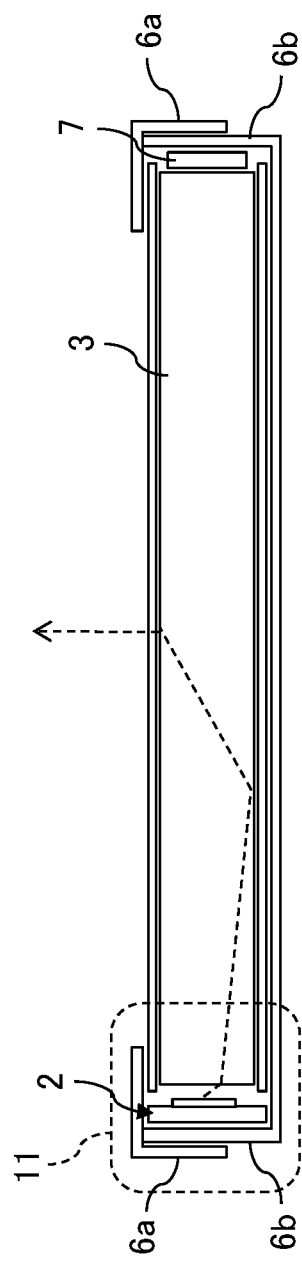
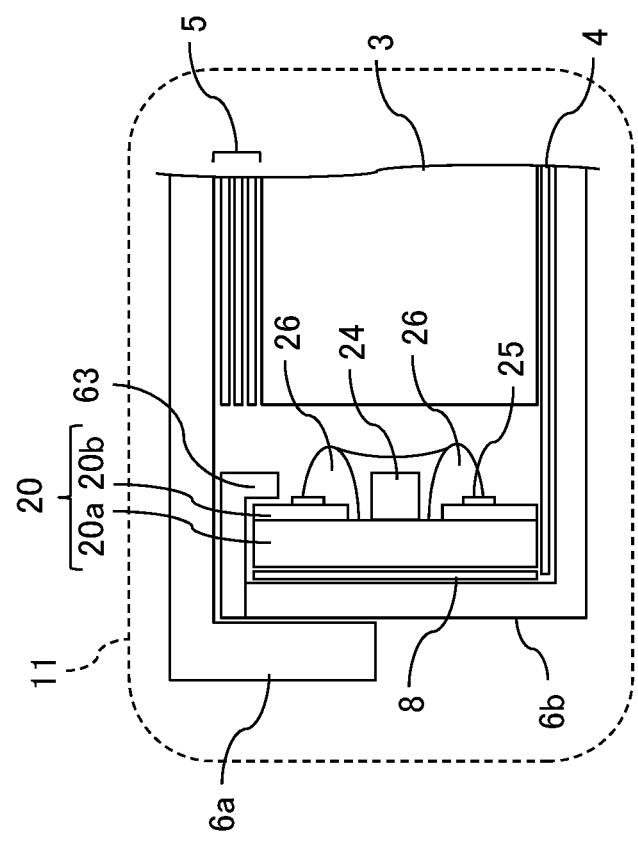
FIG. 5A
FIG. 5B

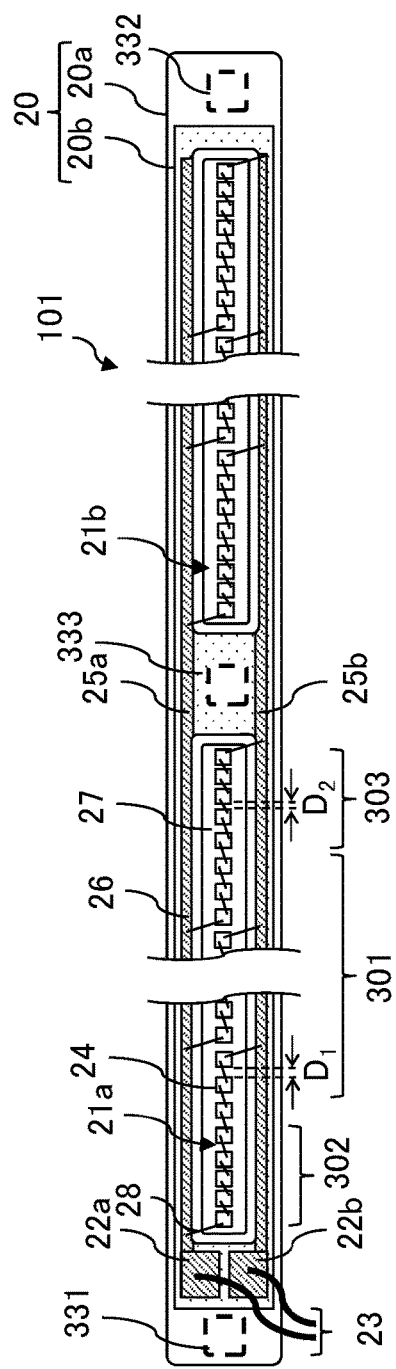
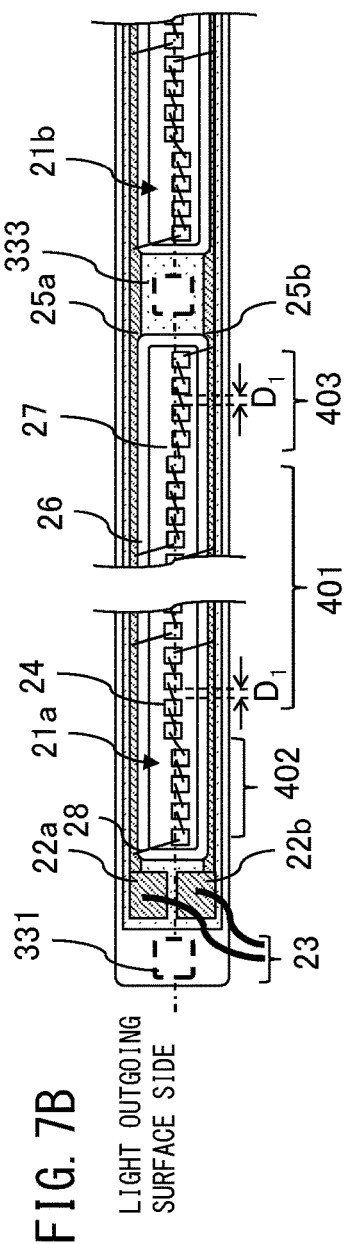
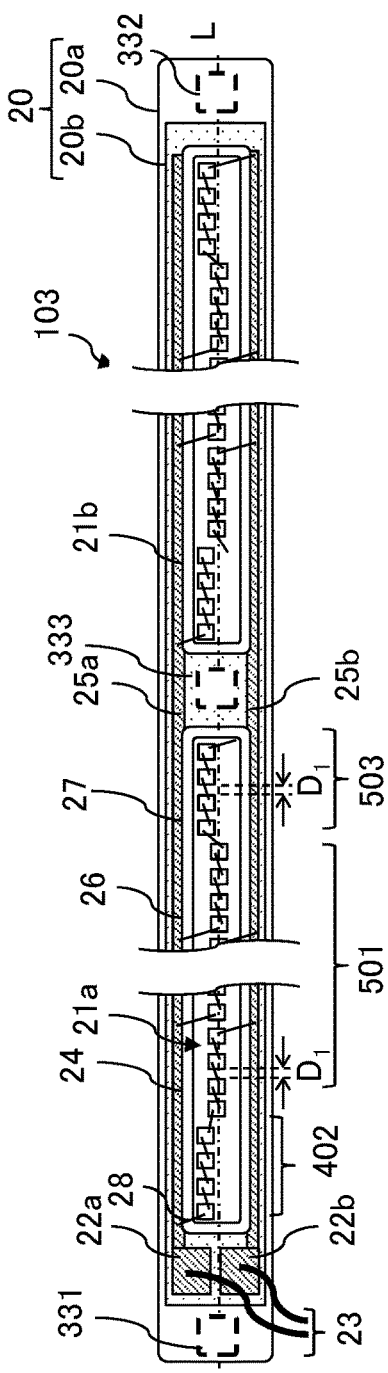
FIG. 7A
FIG. 7B
LIGHT OUTGOING SURFACE SIDE
FIG. 7C
LIGHT OUTGOING SURFACE SIDE

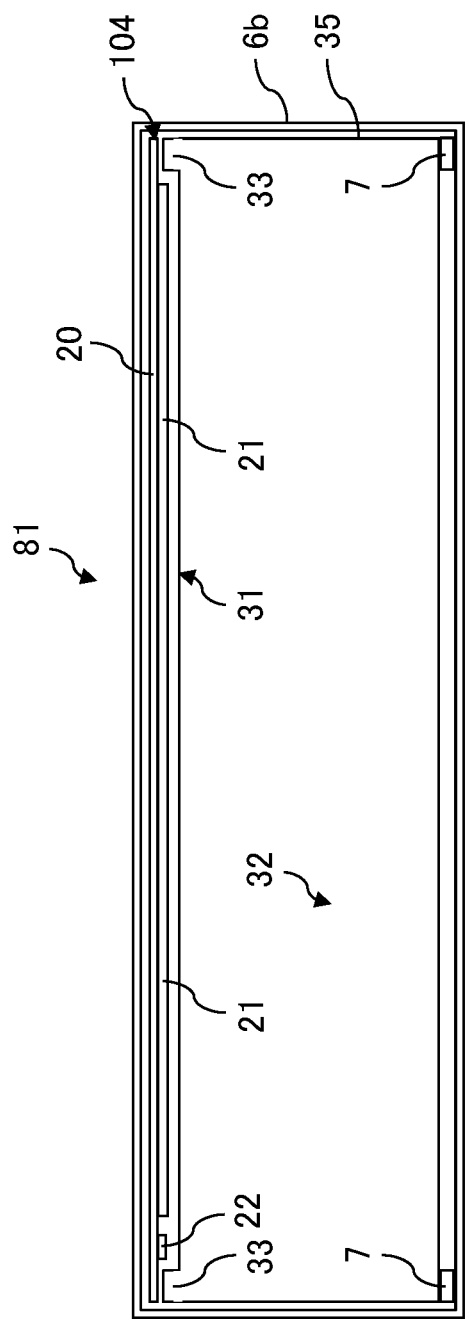

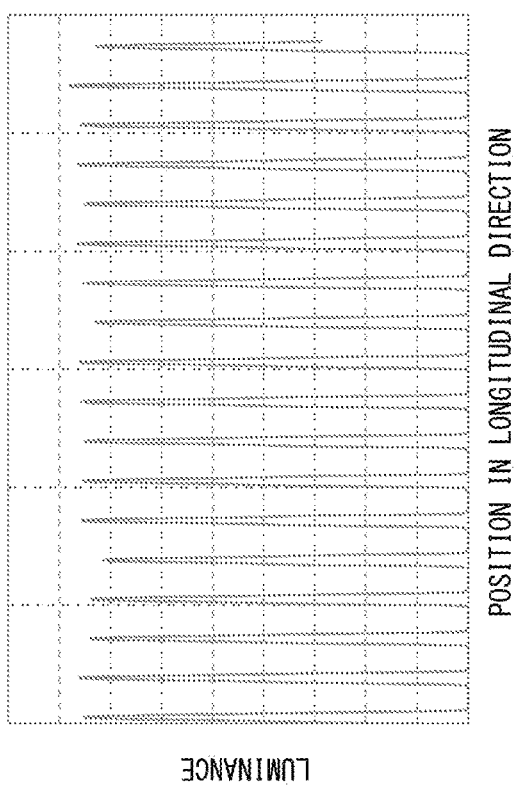
FIG. 18A
FIG. 18B
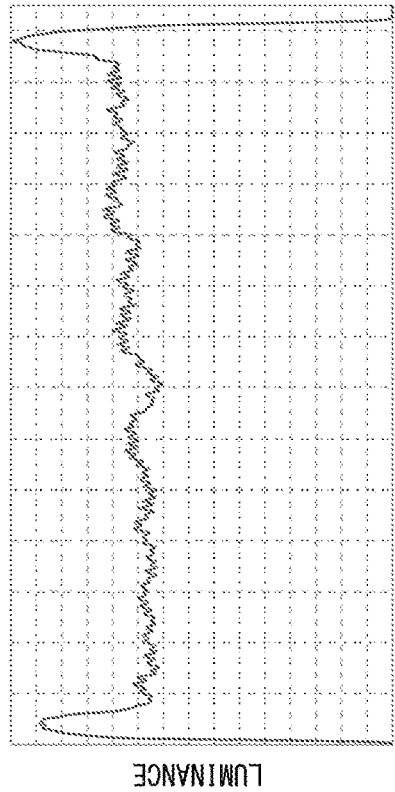
FIG. 18C
FIG. 18D

LINEAR LIGHT-EMITTING DEVICE

CROSS-REFERENCE TO RELATED APPLICATIONS

This application is a U.S. National Stage entry of PCT Application No: PCT/JP2020/025088 filed Jun. 25, 2020, which claims priority to Japanese Patent Application No. 2019-117746 filed Jun. 25, 2019, the contents of which are incorporated herein by reference.

FIELD

The present disclosure relates to a linear light-emitting device.

BACKGROUND

A display device is known including a transmissive display panel such as a liquid crystal panel device and a planar light-emitting device that is light source arranged at the back of the display panel. Concerning a display device, various techniques are known for providing a uniform luminance of an image displayed on a display panel.

For example, U.S. Pat. No. 6,498,258 (hereinafter referred to as Patent Literature 1) describes a technique to prevent luminance of light from becoming non-uniform that is emitted by a linear light-emitter onto light guide plate in a planar light-emitting device, by making non-uniform a luminance distribution of light incident from the linear light-emitter onto the light guide plate.

The technique described in Patent Literature 1 can make uniform a luminance of light incident from a linear light-emitting device onto a light guide plate by gradually changing an arrangement interval of a plurality of light sources arranged in the linear light-emitter, thereby making uniform a luminance of light emitted from the light guide plate.

SUMMARY

However, the technique described Patent Literature 1 gradually changes an arrangement interval between light sources arranged in the linear light-emitting device, so that arrangement intervals between light sources differ from each other. In the technique described Patent Literature 1, arrangement intervals between light sources differ from each other, which means that each of the light sources receives a different quantity of heat from an adjacent light source, i.e. luminescence properties having a temperature dependency differ from each other. In the technique described Patent Literature 1, luminescence properties of light sources differ from each other so as to emit light having a uniform luminance.

The disclosure aims to provide a linear light-emitting device capable of emitting light having a more uniform luminance.

A linear light-emitting device including a substrate extending while being curved in a predetermined direction, a plurality of light-emitting elements arranged on the substrate in a predetermined direction, and a seal for sealing the plurality of light-emitting elements, wherein a luminance of a specific part of the substrate is higher than that of the other parts of the substrate.

A linear light-emitting device including, a substrate extending while being curved in a predetermined direction on which a mounting region extending in the predetermined direction are formed, a plurality of light-emitting elements arranged on the mounting region in the predetermined direction, and a seal arranged for sealing the plurality of light-emitting elements, wherein a luminance just above each of the plurality of light-emitting elements is the same as that of an intermediate position between the plurality of light-emitting elements at a center of the mounting region.

It is preferable in the linear light-emitting device that the plurality of light-emitting elements are arranged in a single row or in a plurality of rows in a longitudinal direction at a center of the mounting region, and are arranged, in the number of rows greater than the number of rows arranged at the center, in the longitudinal direction, in a region adjacent to an end of the mounting region.

It is preferable in the linear light-emitting device that the mounting region has substantially the same shape irrespective of the number of rows of the light-emitting elements.

It is preferable in the linear light-emitting device that the mounting region includes a first mounting region extending in the predetermined direction and a second mounting region extending in the predetermined direction and arranged adjacent to the first mounting region in the predetermined direction.

It is preferable in the linear light-emitting device that the mounting region is not formed in a power source unit for supplying electric power to the plurality of light-emitting elements.

It is preferable in the linear light-emitting device that the plurality of light-emitting elements are arranged, in a region separated from an end of the linear light-emitter, so that their optical axis will match that of the light guide plate, and are arranged, in a region adjacent to the end of the linear light-emitter, so that their optical axis will be arranged deviated from that of the light guide plate in a height direction of the light incident surface.

It is preferable in the linear light-emitting device that the plurality of light-emitting elements are arranged at a uniform arrangement interval in the predetermined direction.

It is preferable in the linear light-emitting device that the plurality of light-emitting elements are arranged uniformly, in a region separated from an end of the linear light-emitter, at a first arrangement pitch in the predetermined direction, and arranged uniformly, in a region adjacent to the end of the linear light-emitter, at a second wiring pitch that is narrower than the first arrangement pitch in the predetermined direction.

It is preferable that f the linear light-emitting device further including a member for suppressing a curving of the substrate.

It is preferable in the linear light-emitting device that further including a frame for controlling light coming from the light-emitting element.

A linear light-emitting device according to the aforementioned disclosure can emit light having a more uniform luminance.

BRIEF DESCRIPTION OF THE DRAWINGS

FIG. 5A is a sectional view of the planar light-emitting device illustrated in FIG. 1 taken along a line A-A';

FIG. 5B is a partial enlarged view of a portion illustrated in dashed lines 11 in FIG. 5A;

FIG. 7A is a partial plan view illustrating a linear light-emitter according to a second variation;

FIG. 7B is a partial plan view illustrating a linear light-emitter according to a third variation;

FIG. 7C is a partial plan view illustrating a linear light-emitter according to a fourth variation;

FIG. 9 is a perspective plan view of a planar light-emitting device including a linear light-emitter according to a fifth variation;

FIG. 18A is an image of luminance distribution of the backlight device including SMDs as a light source;

FIG. 18B is a graph of a luminance distribution of the backlight device including SMDs as a light source;

FIG. 18C is an image of a luminance distribution of the linear light-emitter according to the disclosure;

FIG. 18D is a graph of a luminance distribution of the backlight device including the linear light-emitter as a light source.

DESCRIPTION OF EMBODIMENTS

A preferable embodiment of a linear light-emitting device and a planar light-emitting device according to the disclosure will be described with reference to attached drawings. Note that the technical scope of the disclosure is not limited to such an embodiment but covers the invention and its equivalents, as set forth in the appended claims.

In this specification, while a description is given below, taking as an example, a planar light-emitting device used as a light source to illuminate a transmissive liquid crystal panel such as a liquid crystal panel from the back, applications of a linear light-emitting device and a planar light-emitting device as disclosed in the specification are not limited thereto. For example, a planar light-emitting device disclosed in the specification may be used as a light source for an illumination device or an information display device.

In addition, in the specification, a numeral without an alphabetic character may be used as a generic term for a sign including a combination of a numeral and an alphabetic character. For example, a connector 22 is a generic term for an anode terminal 22a and a cathode terminal 22b.

Figure 1:
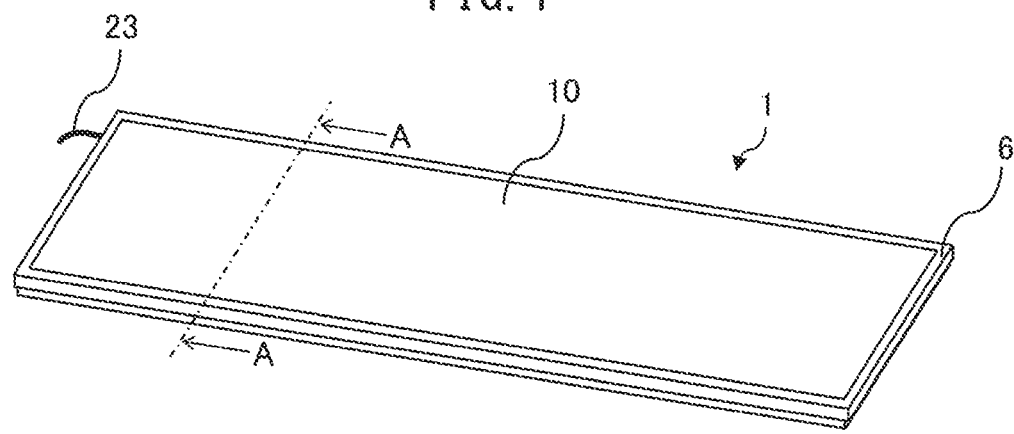
FIG. 1 is a perspective view of a planar light-emitting device according to an embodiment.
Figure 2:
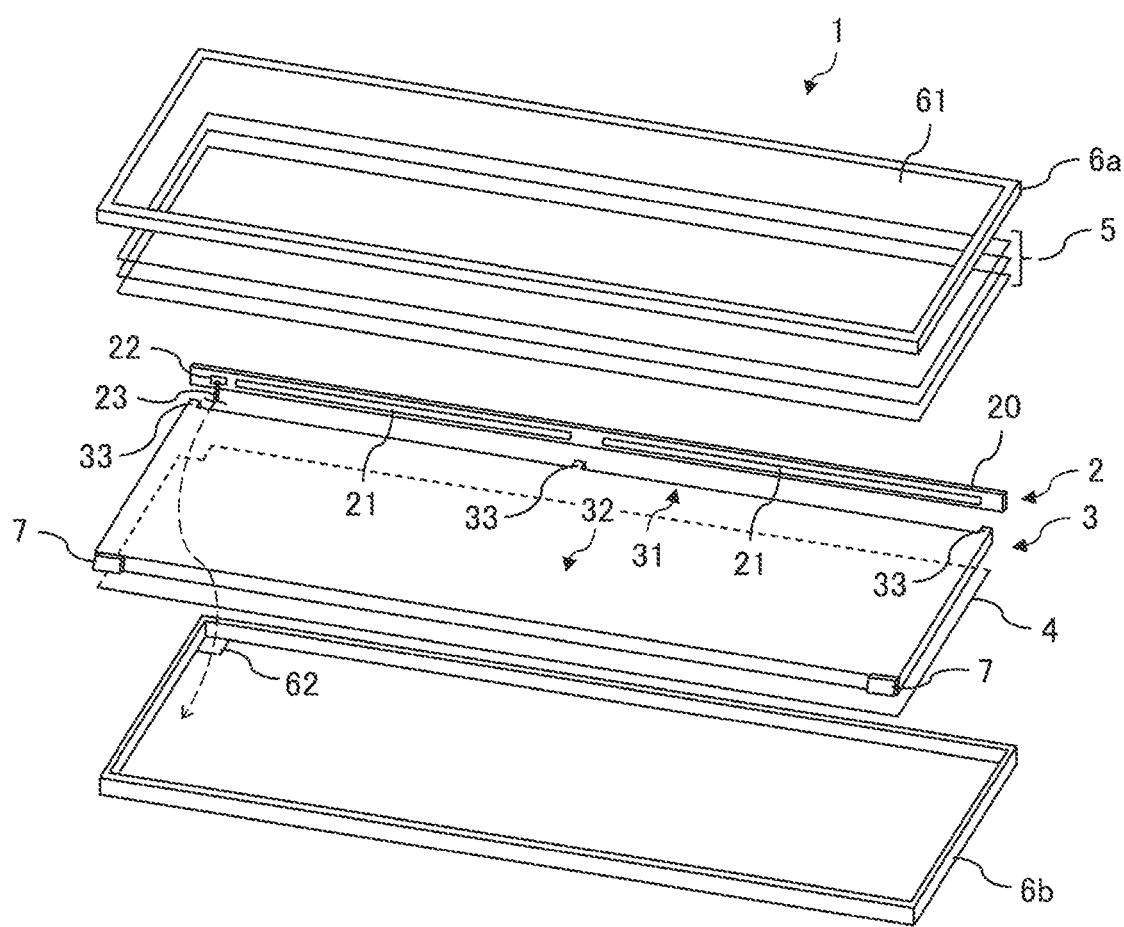
FIG. 2 is an exploded perspective view of an embodiment of the planar light-emitting device illustrated in FIG. 1.
Figure 3:
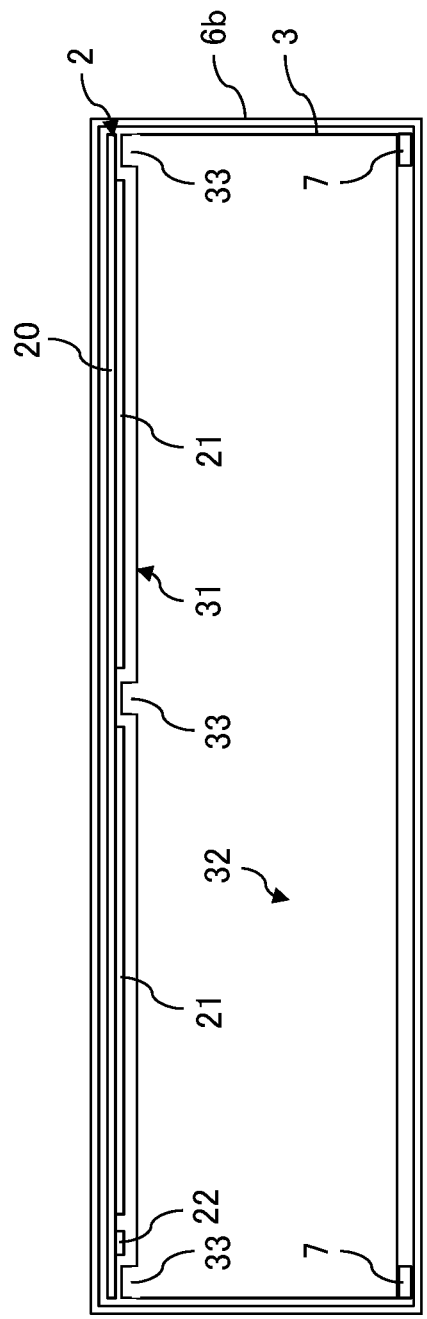
FIG. 3 is a perspective plan view of the planar light-emitting device illustrated in FIG. 1.
Figure 4:
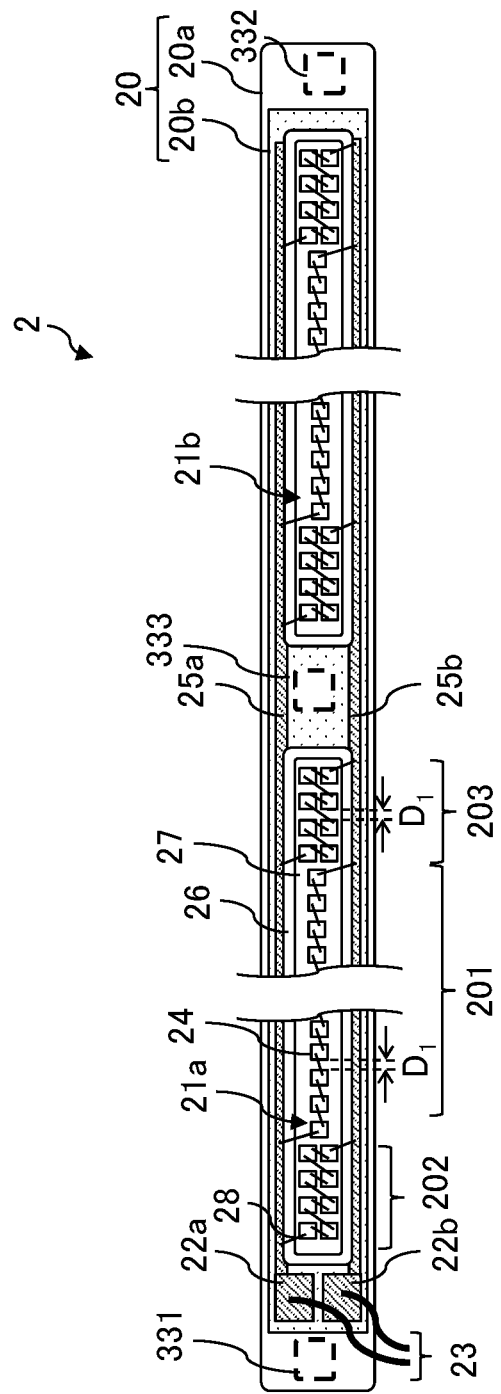
FIG. 4 is an enlarged plan view of a linear light-emitter illustrated in FIG. 1.

FIG. 1 is a perspective view of a planar light-emitting device according to an embodiment. FIG. 2 is an exploded perspective view of an embodiment of the planar light-emitting device illustrated in FIG. 1. FIG. 3 is a perspective plan view of the planar light-emitting device illustrated in FIG. 1. FIG. 4 is an enlarged plan view of a linear light-emitter illustrated in FIG. 1. FIG. 5A is a sectional view of the planar light-emitting device illustrated in FIG. 1 taken along a line A-A'. FIG. 5B is a partial enlarged view of a portion illustrated in dashed lines 11 in FIG. 5A. In FIGS. 5A and 5B, a dashed arrow illustrates an example of an optical path of light emitted from the linear light-emitter.

The planar light-emitting device 1 according to this embodiment includes a linear light-emitter 2, a light guide plate 3, a reflective sheet 4, an optical sheet 5, a case 6, and a spacer 7. The planar light-emitting device 1 has a flat cuboid shape extending in a predetermined direction and emits light having a uniform luminance from a light-emitting surface 10.

The linear light-emitter 2 is a linear light-emitting device that has an elongate rectangle shape extending in a longitudinal direction of the planar light-emitting device 1 and emits a linear light advancing in the longitudinal direction of the planar light-emitting device 1. The linear light-emitter 2 includes a substrate 20 including a mounting substrate 20a and a circuit substrate 20b, a connector 22 connected to a cable 23, light-emitting elements 24, a wiring 25, a frame 26, and a seal 27. In the longitudinal direction of the linear light-emitter 2, the connector 22, the light-emitting elements 24, the seal 27 and the frame 26 are arranged in order.

The linear light-emitter 2 is fixed, with its longitudinal direction aligned that of a lower case 6b, to a lateral portion of the lower case 6b in the longitudinal direction of the lower case 6b by using an adhesive material. The adhesive material preferably has a high heat conductivity and may be arranged for example at the center of the linear light-emitter 2 alone rather than on the entire surface of the linear light-emitter 2 in its longitudinal direction.

The mounting substrate 20a has an elongate rectangle shape extending in a predetermined direction. A longitudinal direction of the mounting substrate 20a matches that of the linear light-emitter 2. A lateral direction of the mounting substrate 20a matches that of the linear light-emitter 2. The mounting substrate 20a is formed of a material having a high heat conductivity, such as a metal including aluminum, or a ceramic. The mounting substrate 20a has a flat surface on which the light-emitting elements 24 are arranged.

The circuit substrate 20b is arranged on the mounting substrate 20a. A longitudinal direction of the circuit substrate 20b matches that of the linear light-emitter 2. A lateral direction of the circuit substrate 20b matches that of the linear light-emitter 2. The circuit substrate 20b includes a pair of elongate openings formed at the center thereof. Regions serving as the pair of openings of the circuit substrate 20b include a first mounting region 21a and a second mounting region 21b both extending in the longitudinal direction of the substrate 20 and mounting the light-emitting elements 24. The first mounting region 21a and the second mounting region 21b are arranged adjacent to each other in a longitudinal direction. The circuit substrate 20b is glued to the mounting substrate 20a via an adhesive material such as an adhesive sheet. The circuit substrate 20b is formed by using an electrically insulating resin such as a phenol resin, an epoxy resin, a polyimide resin or a polyester resin.

On the outside of the surface of the circuit substrate 20b is arranged, in the longitudinal direction of the first mounting region 21a and the second mounting region 21b, a wiring 25 including an anode wiring 25a and a cathode wiring 25b. The anode wiring 25a and the cathode wiring 25b are arranged at an interval from each other in the lateral direction of the circuit substrate 20b and extendingly in the longitudinal direction of the circuit substrate 20b. The anode wiring 25a and the cathode wiring 25b are formed, for example by patterning a conductor such as gold or copper on the circuit substrate 20b. The substrate 20 of the linear light-emitter 2 has an elongate rectangle shape extending in the longitudinal direction of the planar light-emitting device 1 and is thus likely to be curved in the longitudinal direction. Moreover, the planar light-emitting device 1 is likely to warp in the longitudinal direction due to heating of the light-emitting elements 24 and a difference in a thermal expansion coefficient between the mounting substrate 20a and the circuit substrate 20b. The anode wiring 25a and the cathode wiring 25b have a heat dissipation property and a rigidity and thus can suppress the warpage. The anode wiring 25a and the cathode wiring 25b, when arranged so as to hold an opening therebetween, surrounds a heat source and is thus likely to provide an effect of a heat dissipation property, and additionally the heat source is provided with a rigidity on both sides thereof, thereby further suppressing the warpage. A thickness of a wiring material is typically 18 μm, but may be 35 μm or less, 70 μm or less, or 105 μm or less.

The anode wiring 25a and the cathode wiring 25b is electrically connected, at an end of the substrate 20, to a connector 22 as a power source unit that includes an anode terminal 22a and a cathode terminal 22b and supplies electric power to the light-emitting elements 24 via the anode wiring 25a and the cathode wiring 25b. The anode wiring 25a is electrically connected to the anode terminal 22a and the cathode wiring 25b is electrically connected to the cathode terminal 22b. The anode terminal 22a and the cathode terminal 22b is connected to a cable 23 powered by an external power source (not illustrated) via a conductive bonding member such as a solder. The cable 23 is a wire capable of supplying electric power, for example a CV cable. The anode wiring 25a and the cathode wiring 25b are electrically connected to the light-emitting elements 24 via a Zener diode (not illustrated) for preventing an overvoltage from being applied.

The light-emitting elements 24 are for example a blue LED (Light Emitting Diode) die. For example, an InGaN compound semiconductor having light-emitting wavelength range of 440 to 455 nm may be used as the light-emitting elements 24. The light-emitting elements 24 are preferably arranged with the upper surface parallel to a surface of the mounting substrate 20a. For example, the light-emitting elements 24 are glued on the mounting substrate 20a via a die bond. While rectangular light-emitting elements 24 are arranged on the mounting substrate 20a with sides of the rectangular light-emitting elements 24 opposed to each other, the light-emitting elements 24 may be arranged on the mounting substrate 20a while rotated 45 degrees so that apexes of the rectangular light-emitting elements 24 will be opposed to each other.

The light-emitting elements 24 are directly arranged on the mounting substrate 20a having a high heat conductivity. This efficiently transmits heat generated by the light-emitting elements 24 to the mounting substrate 20a, thus suppressing a rise in temperature of the light-emitting elements 24. In this way, high heat dissipation property of the light-emitting elements 24 in the linear light-emitter 2 is also preferable in consideration of a configuration where light-emitting elements 24 are densely mounted on the mounting substrate 20a.

Each of the light-emitting elements 24 includes a cathode and an anode. A total of eight light-emitting elements 24 are connected in series between the anode wiring 25a and the cathode wiring 25b via the wire 28 to form light-emitting element rows. In one example, in the linear light-emitter 2, 26 light-emitting element rows are formed and a total of 208 light-emitting elements are mounted on the substrate 20. The number of light-emitting elements 24 included in light-emitting element row is appropriately determined depending on an output voltage of a drive circuit. The number of rows arranged in the linear light-emitter 2 is determined depending on a luminance of light emitted by the planar light-emitting device 1.

When a DC voltage is applied to the anode wiring 25a and the cathode wiring 25b from an external power source via the cable 23, the anode terminal 22a and the cathode terminal 22b, the light-emitting elements 24 illuminate simultaneously.

The light-emitting elements 24 are arranged in a single row in the longitudinal direction of the substrate 20 at a center 201 of the first mounting region 21a and the second mounting region 21b, and in two rows in the longitudinal direction of the substrate 20 at ends 202 and 203 of the first mounting region 21a and the second mounting region 21b. The first mounting region 21a and the second mounting region 21b have substantially the same shape irrespective of the number of rows of the light-emitting elements 24. In other words, in the first mounting region 21a and the second mounting region 21b, a planar shape of the center 201 where the light-emitting elements 24 are arranged in a single row is substantially the same as a planar shape of the ends 202 and 203 where the light-emitting elements 24 are arranged in two rows.

The light-emitting elements 24 are arranged at a uniform arrangement interval $D_1$ in the longitudinal direction of substrate 20 at each of the center 201 and the ends 202 and 203 of the first mounting region 21a and the second mounting region 21b.

The frame 26, also called a dam, is arranged so as to surround each of the first mounting region 21a and the second mounting region 21b where the light-emitting elements 24 are mounted. A longitudinal direction of the frame 26 matches that of the linear light-emitter 2. A linear direction of the frame 26 matches that of the linear light-emitter 2. The frame 26 has a circular shape extending in the longitudinal direction of the linear light-emitter 2.

The frame 26 is formed of an elongate continuous frame having substantially the same width arranged in a circular shape. The continuous frame is preferably formed of a white resin. For example, the continuous frame is formed by using a silicon resin or an epoxy resin in which minute particles of titanium oxide and etc., are dispersed. Light emitted from the light-emitting elements 24 toward the frame 26 is reflected on the inner side of the frame 26, i.e. on the surface facing the light-emitting elements 24 and is emitted toward above the linear light-emitter 2. When the seal 27 is formed of a resin having a high thixotropy, the frame 26 may be omitted.

The seal 27 is filled in the first mounting region 21a and the second mounting region 21b surrounded by the frame 26 to seal the light-emitting elements 24 mounted on the first mounting region 21a and the second mounting region 21b and a wire 28 that electrically interconnects the light-emitting elements 24. The seal 27 is a member formed of a resin having a translucency to light generated based on the light-emitting elements 24 and containing a phosphor. The light generated based on the light-emitting elements 24 includes light emitted by the light-emitting elements 24 and light that is wavelength converted by the phosphor. The phosphor absorbs blue light emitted by the light-emitting elements 24 and performs wavelength conversion into yellow light. The phosphor is, for example, a particulate phosphor material such as Yttrium Aluminum Garnet (YAG). Mixing yellow light obtained via wavelength conversion by the phosphor and blue light obtains white light. The seal 27 may be formed of, for example, a resin such as an epoxy resin or a silicon resin containing a phosphor. The seal 27 may contain a phosphor that absorbs blue light and performs wavelength conversion into light of another color (such as red or green). In addition, the seal 27 may not contain a phosphor.

The light guide plate 3 includes a light incident surface 31 for receiving light emitted by the linear light-emitter 2, a light outgoing surface 32 for emitting light entering the light incident surface 31 and a protrusion 33, and has a flat cuboid shape extending in the longitudinal direction of the planar light-emitting device 1. The light guide plate 3 guides to change a direction of the light entering the light incident surface 31 and emits the same from the light outgoing surface 32 oriented orthogonal to the light incident surface 31.

The light guide plate 3 is formed of a material that propagates light emitted by the linear light-emitter 2. The light guide plate 3 is formed of, for example, a resin such as a polycarbonate resin or an acrylic resin. In addition, the light guide plate 3 receives alight having a high luminance from the linear light-emitter 2, and thus may be formed using a highly light-resistant material. For example, glass may be used as a highly light-resistant material. The light guide plate 3 is accommodated in a lower case 6b so that an optical axis of the light incident surface 31 will match that of the light-emitting elements 24 mounted on the linear light-emitter 2.

In addition, a surface that is opposed to the light outgoing surface 32 of the light guide plate 3 and is contact with the reflective sheet 4 includes a finely rugged structure formed thereon, and reflects light incident on a surface opposed to the light outgoing surface 32 in a direction of the light outgoing surface 32 via the finely rugged structure and emits the light from the light outgoing surface 32.

The protrusion 33 is arranged on both sides of the light incident surface 31 in the longitudinal direction and at a center thereof, and when the linear light-emitter 2 is curved due to heat from emission and etc., makes contact with contact regions 331-333 on the surface of the linear light-emitter 2 to prevent separation of the linear light-emitter 2 from a side of the lower case 6b in the longitudinal direction. The contact region 331 is a surface of one end of the substrate 20, the contact region 332 is a surface of the other end of the substrate 20, and the contact region 333 is a surface of the center of the substrate 20. The first mounting region 21a or the second mounting region 21b is not formed on the surface of the linear light-emitter 2 with which the protrusion 33 makes contact. The first mounting region 21a and the second mounting region 21b are formed on the surface of the linear light-emitter 2 with which the protrusion 33 makes no contact.

A shape of the light guide plate 3 is not limited to a rectangle extending in a longitudinal direction. The shape of the light guide plate 3 may be appropriately determined to correspond to a surface shape of light emitted by an apparatus that incorporates the planar light-emitting device 1. For example, the shape of the light guide plate 3 may be a polygon other than a square or a rectangle, or may be an ellipse. In addition, for example, when the planar light-emitting device 1 is used as a light source for an illumination device, the shape of light guide plate 3 may be a circle, an ellipse or a polygon.

The reflective sheet 4 reflects, onto the light guide plate 3, light emitted from a surface opposed to the light outgoing surface 32 of the light guide plate 3. The reflective sheet 4 may use, for example, a metal plate having a light reflecting function, a film, a foil, a film with a silver vapor deposition film layer formed thereon, a film with an aluminum vapor deposition film later formed thereon, or a while sheet.

The optical sheet 5 includes, for example, a diffusion sheet, a light collecting sheet and a reflective polarizing plate. The diffusion sheet is formed, for example, by dispersing silica particles in a resin such as a polycarbonate resin or an acrylic resin. Light emitted from the light outgoing surface 32 of the light guide plate 3 penetrates the optical sheet 5 in a diffusive fashion. The light collecting sheet is a sheet material having a surface opposed to the reflective polarizing plate on which surface is formed a minute light collecting group of a prism sheet and etc. The light collecting sheet adjusts a light distribution of light incident on the diffusion sheet and emits the same toward the reflective polarizing plate. The reflective polarizing plate has a multilayer film structure formed of a resin and etc., and transmits either one of an S component and a P component of light incident on the light collecting sheet and reflects the other component. Light of a component reflected by the light collecting sheet travels toward the reflective sheet, is converted to light of a component that penetrates the reflective polarizing plate before entering the reflective polarizing plate.

A sheet material included in the optical sheet 5 arranged on the light guide plate 3 is not limited to the above-mentioned examples. For example, when the planar light-emitting device 1 is used as a light source for a general illumination device, a first diffusion sheet and a second diffusion sheet may be arranged in order on the light guide plate 3. In addition, when the planar light-emitting device 1 is used as a light source for a large-sized display device, a first diffusion sheet, a second diffusion sheet and a light collecting sheet may be arranged in order on the light guide plate 3. In addition, when the planar light-emitting device 1 is used as a light source for a large-sized, middle-sized, or small-sized display device, a diffusion sheet and a light collecting sheet may be arranged in order on the light guide plate 3. In addition, when the planar light-emitting device 1 is used as a light source for a small-sized display device, a diffusion sheet, a first light collecting sheet and a second light collecting sheet may be arranged in order on the light guide plate 3.

The case 6 includes an upper case 6a and a lower case 6b. The upper case 6a is a frame-shaped member with a rectangular opening 61 formed therein. The lower case 6b is a box-shaped member with an opening 62 for a cable to pass through formed in the bottom surface. The upper case 6a and the lower case 6b each have a planar shape of a rectangle and accommodate a linear light-emitter 2, a light guide plate 3, a reflective sheet 4 and an optical sheet 5. the case 6 accommodates the linear light-emitter 2 and the light guide plate 3 so that a light-emitting region of the linear light-emitter 2 will be opposed to a light incident surface of the light guide plate 3. The optical sheet 5 is exposed from the opening 61 in the upper case 6a. Light emitted from the linear light-emitter 2 exits in a uniform planar shape from the light-emitting surface 10 serving as the opening 61 to the outside of the planar light-emitting device 1.

Next, operation of the planar light-emitting device 1 according to the above-mentioned embodiment will be described below.

As illustrated in FIG. 5 A, the light-emitting elements 24 in the linear light-emitter 2 illuminate when an external electric power is supplied to a cable 23. Linear light emitted from the linear light-emitter 2 enters the light incident surface 31 of the light guide plate 3.

A majority of light emitted from the linear light-emitter 2 enters the light incident surface 31 of the light guide plate 3. A part of light entering the light incident surface 31 and emitted from the linear light-emitter 2 is reflected on the frame 26 and enters the light incident surface 31 of the light guide plate 3. A relation between a height of the surface of the seal 27 and a height of the frame 26 may be appropriately designed based on a positional relation between dimensions of the linear light-emitter 2 or a relation between the linear light-emitter 2 and the light guide plate 3. In addition, it is possible to increase the height of the frame 26 within a permissible design range of the planar light-emitting device 1 to reduce a distance between the frame 26 and the light incident surface 31 of the light guide plate 3. This approach allows light emitted from the linear light-emitter 2 to efficiently enter the light incident surface 31 of the light guide plate 3. Light entering the light incident surface 31 of the light guide plate 3 is reflected by the reflective sheet 4 or the like and is emitted from the light outgoing surface 32 toward an optical sheet. Light emitted in a planar shape from the light outgoing surface 32 of the light guide plate 3 penetrates the optical sheet 5 and is emitted to the outside of the planar light-emitting device 1.

The planar light-emitting device 1 includes a linear light-emitter where light-emitting elements are densely mounted, and is thus capable of emitting planar light having a high luminance.

In addition, in the planar light-emitting device 1, the light-emitting elements 24 are arranged in a single row in the longitudinal direction of the substrate 20 at the center of the first mounting region 21a and the second mounting region 21b, and in two rows in the longitudinal direction of the substrate 20 at an end of the first mounting region 21a and the second mounting region 21b. The light-emitting elements 24 are arranged in two rows at ends of the first mounting region 21a and the second mounting region 21b where a luminance drops due to interference with the protrusion 33 of the light guide plate 3. It is thus possible to cover the drop in the luminance due to the protrusion 33 and accordingly emit light having a more uniform luminance.

A linear light-emitter according to an embodiment may be formed to provide a difference in a luminance of a light-emitting region so that only a specific part of the light-emitting region will be bright or only a specific part of the light-emitting region will be dark. In this embodiment, the linear light-emitter 2 is formed so that only a periphery of a position opposed to a dark part of the light guide plate will be bright by arranging the light-emitting elements 24 in two rows at the ends 202 and 203, as positions opposed to the dark part of the light guide plate, of the first mounting region 21a and the second mounting region 21b. In addition, a linear light-emitter according to an embodiment may be formed so that a specific part in the light-emitting region will be dark in the absence of the light-emitting elements 24 on a corresponding mounting region.

In addition, in this embodiment, the linear light-emitter 2, the first mounting region 21a and the second mounting region 21b where the light-emitting elements 24 are mounted are filled with the seal 27, so that light emitted from the light-emitting elements 24 is diffused in the periphery of the light-emitting elements 24 by the seal 27. Light emitted from the light-emitting elements 24 is diffused in the periphery of the light-emitting elements 24, so that a luminance of an intermediate position between the light-emitting elements 24 is the same as that just above each of the light-emitting elements 24. In addition, in a linear light-emitter according to an embodiment, the light-emitting elements 24 may be mounted so that a luminance of a specific part of a light-emitting region will be higher than that of the other parts of the light-emitting region, or the light-emitting elements 24 may be mounted so that a luminance of a specific part of a light-emitting region will be lower than that of the other parts of the light-emitting region. An expression that a luminance is the same between two parts of a light-emitting region denotes that a luminance of a dark part is 90% or more of that of a bright part. In addition, an expression that a luminance of a specific part of a light-emitting region is lower than that of the other parts denotes that a luminance of a dark part is less than 90% of that of a bright part.

At the center 201 of the first mounting region 21a and the second mounting region 21b, the light-emitting elements 24 are arranged at an interval whereby a luminance of an intermediate position between the light-emitting elements 24 becomes the same as that just above each of the light-emitting elements 24. This configuration allows uniform light to enter the opposing light incident surface 31 of the light guide plate 3. In addition, in a linear light-emitter according to an embodiment, it is possible to reduce, in the absence of the light-emitting elements on a mounting region serving as a specific part of a light-emitting region, a luminance of the specific part of the light-emitting region to below that of the other parts of the light-emitting region.

In a linear light-emitter according to an embodiment, the number and a mounting interval of the light-emitting elements 24 arranged in two rows at the two ends 202 and 203 of the first mounting region 21a and the second mounting region 21b, may be adjusted so that emitted light from a light guide plate will be uniform over an entire surface. For example, it is possible to use optical simulation to determine the number and the mounting interval of the light-emitting elements 24 whereby emitted light from a light guide plate is uniform over an entire surface.

It is possible to form the frame 26 into the same shape irrespective of the number of rows of light-emitting elements, so that a wiring of a circuit substrate or the shape of the case 6 need not be changed. In addition, even when the number of rows of light-emitting elements is increased, emitted light from light-emitting elements is reflected on the frame 26, and thus so-called side leakage light does not increase and a light-emitting region has substantially the same shape as that of the frame 26.

The planar light-emitting device 1 is an example of a planar light-emitting device according to the disclosure and may be modified in a variety of ways. For example, in the planar light-emitting device 1, while the light-emitting elements 24 are arranged in two rows at an end of the first mounting region 21a and the second mounting region 21b, the light-emitting elements 24 may be arranged in three or more rows at an end of a mounting region, in a planar light-emitting device according to an embodiment. In addition, while four light-emitting elements 24 are arranged at the ends 202 and 203 in two rows in the longitudinal direction of the substrate 20, the number of the light-emitting elements 24 arranged in two rows may be appropriately changed so that luminance of emitted light from the light-emitting surface 10 will be uniform, in a planar light-emitting device according to an embodiment.

Figure 6:
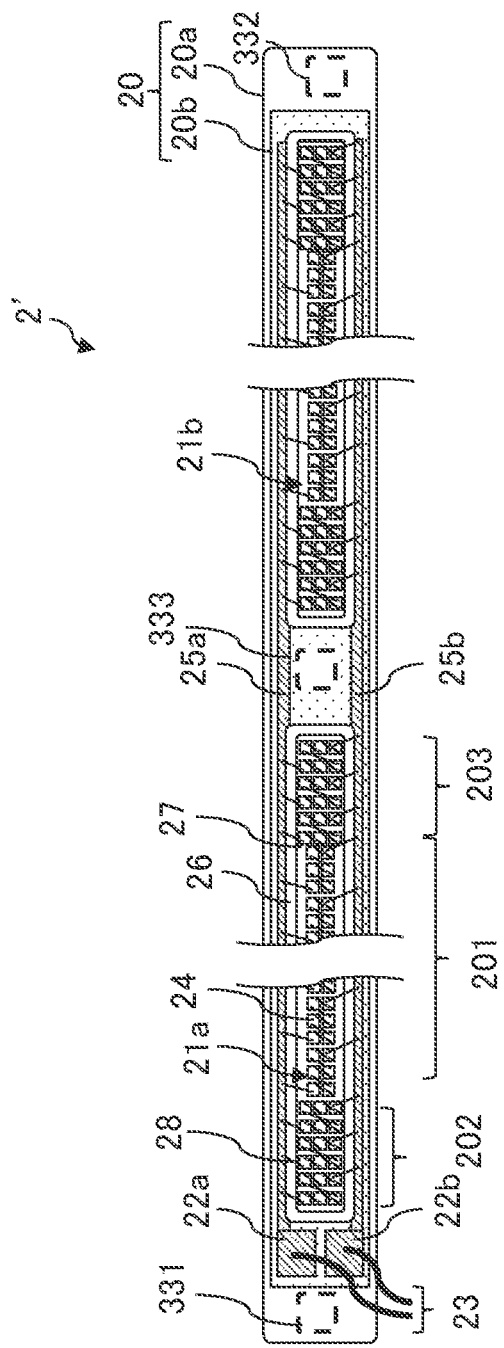
FIG. 6 is a partial plan view illustrating a linear light-emitter according to a first variation.

FIG. 6 is a partial plan view illustrating a linear light-emitter according to a first variation.

A linear light-emitter 2' according to a first variation differs from the linear light-emitter 2 in terms of the number of the light-emitting elements 24 arranged in a lateral direction of the first mounting region 21a and the second mounting region 21b. A configuration and a function of components of the linear light-emitter 2' except the number of the light-emitting elements 24 arranged in a lateral direction of the first mounting region 21a and the second mounting region 21b are the same as those of the components of the linear light-emitter 2 that are given the same signs, so that a detailed description is omitted.

In the linear light-emitter 2' according to the first variation, the light-emitting elements 24 are arranged in two rows in the lateral direction at a center of each of the first mounting region 21a and the second mounting region 21b. In addition, in the linear light-emitter 2' according to the first variation, the light-emitting elements 24 are arranged in three rows in the lateral direction in a region adjacent to the ends of each of the first mounting region 21a and the second mounting region 21b. In a linear light-emitter according to an embodiment, the light-emitting elements 24 are arranged in a single row or in multiple rows in a longitudinal direction at a center of a mounting region, and are arranged, in the number of rows greater than the number of rows arranged at the center, in the longitudinal direction, in a region adjacent to an end of the mounting region.

In addition, in the planar light-emitting device 1, the light-emitting elements 24 are arranged in two rows at the ends 202 and 203 of the first mounting region 21a and the second mounting region 21b. However, in a planar light-emitting device according to an embodiment, light-emitting elements 24 may be arranged in two rows in a predetermined direction in a region adjacent to regions 331-333 with which a protrusion 33 makes contact. The region adjacent to the regions 331-333 with which the protrusion 33 makes contact is a region where a luminance of an end of a light outgoing surface of a light guide plate 3 on a light incident surface side is less than approximately 80% of that at a center of the light outgoing surface of the light guide plate 3. In addition, a region separated from the regions 331-333 with which the protrusion 33 makes contact is a region where a luminance of the end of the light outgoing surface of the light guide plate 3 on the light incident surface side is 80% or more of that at the center of the light outgoing surface of the light guide plate 3.

In addition, in the planar light-emitting device 1, while the light-emitting elements 24 are mounted in two mounting regions, i.e. the first mounting region 21a and the second mounting region 21b in a linear light-emitter 2, the light-emitting elements 24 may be mounted in a single mounting region or in three or more mounting regions in a planar light-emitting device according to an embodiment.

When the light-emitting elements 24 are mounted on three or more mounting regions in a linear light-emitter, the light-emitting elements 24 are arranged in a single row in a longitudinal direction at a center of each mounting region and the light-emitting elements 24 are arranged in two rows in the longitudinal direction at an end of each mounting region.

In addition, while a luminance of light emitted from the ends of a mounting region is increased by arranging the light-emitting elements 24 in two rows at an end of the mounting region in the planar light-emitting device 1, a luminance of light emitted from the ends of a mounting region may be increased via another configuration in a planar light-emitting device according to an embodiment.

Figure 8A:
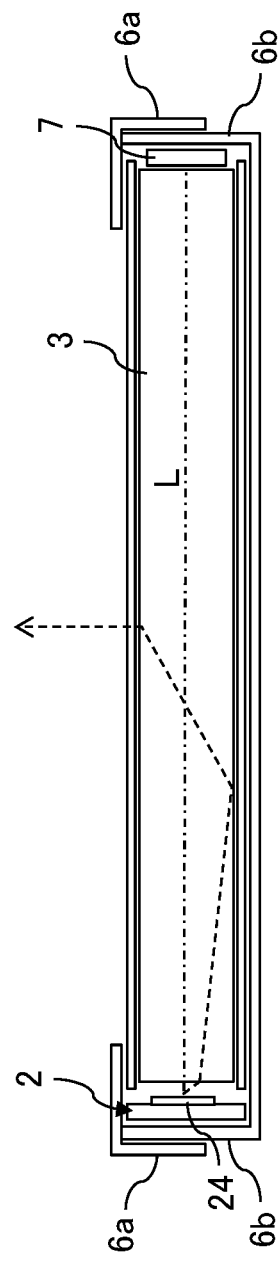
FIG. 8A illustrates an example of light emitted from light-emitting elements arranged so that an optical axis of the light-emitting elements will match that of a light guide plate.
Figure 8B:
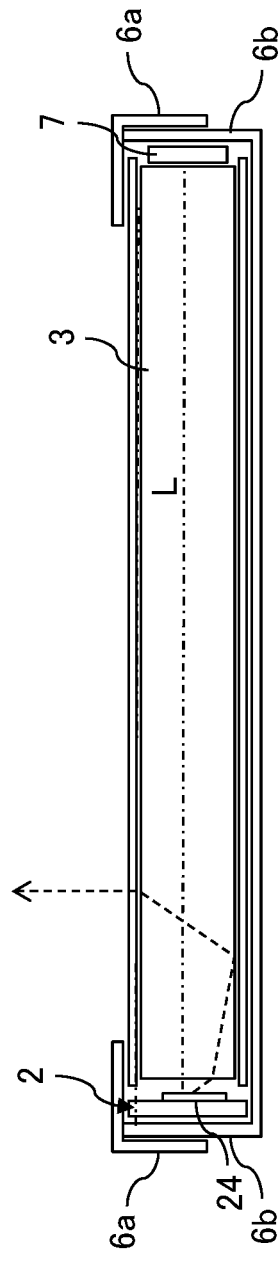
FIG. 8B illustrates an example of light emitted from the light-emitting elements arranged so that the optical axis of the light-emitting elements will be located below that of the light guide plate.
Figure 8C:
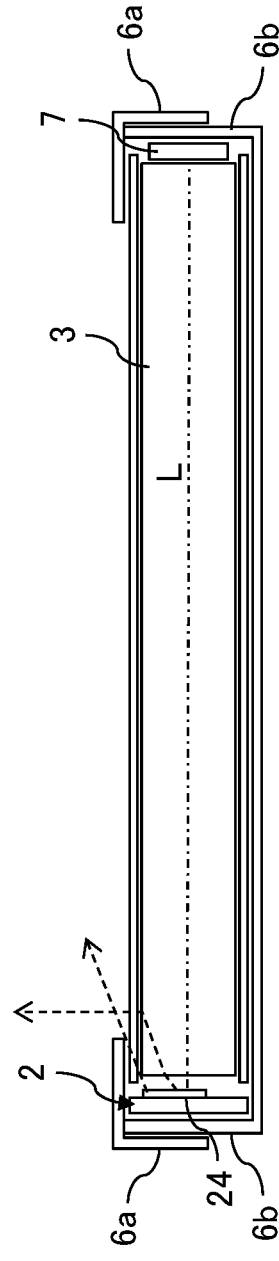
FIG. 8C illustrates an example of light emitted from the light-emitting elements arranged so that the optical axis of the light-emitting elements will be located above that of the light guide plate.

FIG. 7A is a partial plan view illustrating a linear light-emitter according to a second variation. FIG. 7B is a partial plan view illustrating a linear light-emitter according to a third variation. FIG. 7C is a partial plan view illustrating a linear light-emitter according to a fourth variation. FIG. 8A illustrates an example of light emitted from light-emitting elements arranged so that an optical axis of the light-emitting elements will match that of a light guide plate. FIG. 8B illustrates an example of light emitted from the light-emitting elements arranged so that the optical axis of the light-emitting elements will be located below that of the light guide plate. FIG. 8C illustrates an example of light emitted from the light-emitting elements arranged so that the optical axis of the light-emitting elements will be located above that of the light guide plate.

A linear light-emitter 101 according to the second variation differs from the linear light-emitter 2 in terms of an arrangement shape of the light-emitting elements 24 arranged in the first mounting region 21a and the second mounting region 21b. A configuration and a function of components of the linear light-emitter 101 except the arrangement shape of the light-emitting elements 24, are the same as those of the components of the linear light-emitter 2 that are given the same signs, so that a detailed description is omitted.

At a center 301 of each of the first mounting region 21a and the second mounting region 21b, the light-emitting elements 24 are arranged, in a similar way to the center 201 of each of the first mounting region 21a and the second mounting region 21b of the linear light-emitter 2, at a uniform arrangement interval $D_1$ in the longitudinal direction of the substrate 20.

At ends 302 and 303 of the first mounting region 21a and the second mounting region 21b, the light-emitting elements 24 are arranged at a uniform arrangement interval $D_2$ that is narrower than the arrangement interval $D_1$ at the center 201 in the longitudinal direction of the substrate 20.

In the linear light-emitter 101, the light-emitting elements 24 are arranged, at the ends 302 and 303, at a uniform arrangement interval $D_2$ that is narrower than the arrangement interval $D_1$ at the center 201. It is thus possible to increase a luminance of light emitted from the ends 302 and 303 above that of light emitted from the center 301.

A linear light-emitter 102 according to the third variation differs from the linear light-emitter 2 in terms of an arrangement shape of the light-emitting elements 24 arranged in the first mounting region 21a and the second mounting region 21b. A configuration and a function of components of the linear light-emitter 102 except the arrangement shape of the light-emitting elements 24, are the same as those of the components of the linear light-emitter 2 that are given the same signs, so that a detailed description is omitted.

At a center 401 of each of the first mounting region 21a and the second mounting region 21b, the light-emitting elements 24 are arranged, in a similar way to the center 201 of each of the first mounting region 21a and the second mounting region 21b of the linear light-emitter 2, at a uniform arrangement interval $D_1$ in the longitudinal direction of the substrate 20. In addition, an optical axis of the light-emitting elements 24 arranged at the center 401 of each of the first mounting region 21a and the second mounting region 21b is arranged so as to match an optical axis of the light guide plate 3 illustrated in dot-and-dash lines L. The optical axis of the light guide plate 3 is located at a height marching a center of the light incident surface 31 of the light guide plate 3 in a height direction.

At ends 402 and 403 of the first mounting region 21a and the second mounting region 21b, the light-emitting elements 24 are arranged, in a similar way to the center 401, at the arrangement interval $D_1$ in the longitudinal direction of the substrate 20. However, the light-emitting elements 24 arranged at the ends 402 and 403 of the first mounting region 21a and the second mounting region 21b are arranged so that their optical axis will be located at a more distant position from the light outgoing surface 32 than the optical axis of the light guide plate 3, i.e. a position close to a bottom surface of the lower case 6b.

In the linear light-emitter 102, the light-emitting elements 24 are arranged at the ends 402 and 403 so that their optical axis will be located at a distant position from the light outgoing surface 32, so that a greater portion of light emitted from the ends 402 and 403 is reflected on the reflective sheet 4 at a position close to the linear light-emitter 102, and thus a greater portion of light is emitted from the light outgoing surface 32 of the light guide plate 3 at a position close to the linear light-emitter 102. As illustrated in FIG. 8B, in the linear light-emitter 102, light emitted from the light-emitting elements 24 having an optical axis located below that of the light guide plate is emitted from the light outgoing surface 32 at a position close to the linear light-emitter 102. As illustrated in FIG. 8B, the light-emitting elements 24 arranged at the ends 402 and 403 can adjust a luminance of light emitted from the light outgoing surface 32 adjacent to the protrusion 33 of the light guide plate 3 to be substantially equal to a luminance of light emitted from the light outgoing surface 32 that is separated from the protrusion 33.

A linear light-emitter 103 according to the fourth variation differs from the linear light-emitter 2 in terms of an arrangement shape of the light-emitting elements 24 arranged in the first mounting region 21a and the second mounting region 21b. A configuration and a function of components of the linear light-emitter 103 except the arrangement shape of the light-emitting elements 24, are the same as those of the components of the linear light-emitter 2 that are given the same signs, so that a detailed description is omitted.

At a center 501 of each of the first mounting region 21a and the second mounting region 21b, the light-emitting elements 24 are arranged, in a similar way to the center 201 of each of the first mounting region 21a and the second mounting region 21b of the linear light-emitter 2, at a uniform arrangement interval $D_1$ in the longitudinal direction of the substrate 20. In addition, an optical axis of the light-emitting elements 24 arranged at the center 501 of each of the first mounting region 21a and the second mounting region 21b is arranged so as to match an optical axis of the light guide plate 3 illustrated in dot-and-dash lines L.

At ends 502 and 503 of the first mounting region 21a and the second mounting region 21b, the light-emitting elements 24 are arranged, in a similar way to the center 501, at the arrangement interval $D_1$ in the longitudinal direction of the substrate 20. However, the light-emitting elements 24 arranged at the ends 502 and 503 of the first mounting region 21a and the second mounting region 21b are arranged so that their optical axis will be located at a closer position to the light outgoing surface 32 than the optical axis of the light guide plate 3.

In the linear light-emitter 103, the light-emitting elements 24 are arranged at the ends 502 and 503 so that their optical axis will be located at a closer position to the light outgoing surface 32 than the optical axis of the light guide plate 3, so that light emitted from the ends 502 and 503 is emitted from the light outgoing surface 32 of the light guide plate 3 at a position close to the linear light-emitter 103. In the linear light-emitter 103, light emitted from an end is emitted from the light outgoing surface 32 at a position close to the linear light-emitter 103. It is thus possible to adjust a luminance of light emitted from the light outgoing surface 32 that is adjacent to the protrusion 33 of the light guide plate 3 to be substantially equal to a luminance of light emitted from the light outgoing surface 32 that is separated from the protrusion 33.

In addition, in the linear light-emitter 103, the light-emitting elements 24 are arranged at the ends 502 and 503 so that their optical axis will be located at a closer position to the light outgoing surface 32 than the optical axis of the light guide plate 3, so that, as illustrated in FIG. 8C, a portion of light emitted from the ends 502 and 503 leaks onto the light outgoing surface 32. In the linear light-emitter 103, light emitted from an end is emitted from the light outgoing surface 32 at a position close to the linear light-emitter 103. It is thus possible to adjust a luminance of light emitted from the light outgoing surface 32 that is adjacent to the protrusion 33 of the light guide plate 3 to be substantially equal to a luminance of light emitted from the light outgoing surface 32 that is separated from the protrusion 33.

Figure 10:
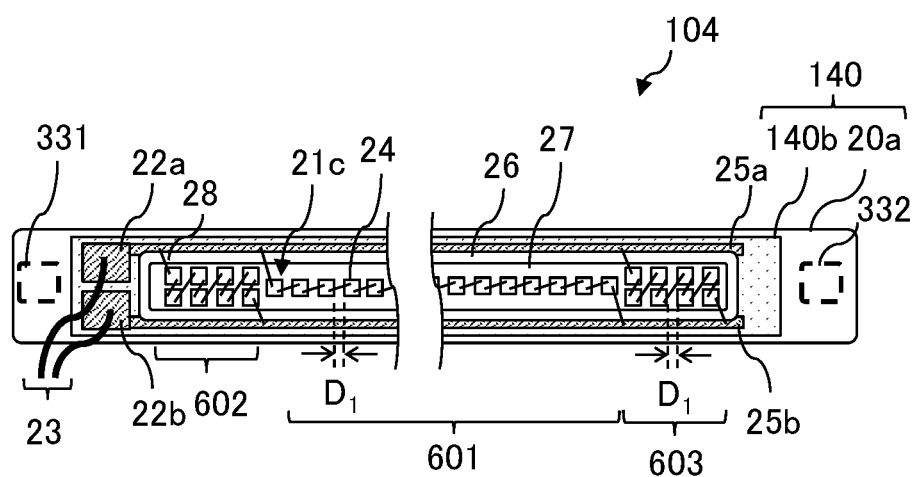
FIG. 10 is an enlarged plan view of the linear light-emitter according to the fifth variation.

FIG. 9 is a perspective plan view of a planar light-emitting device including a linear light-emitter according to a fifth variation. FIG. 10 is an enlarged plan view of the linear light-emitter according to the fifth variation.

A planar light-emitting device 81 differs from the planar light-emitting device 1 in that the planar light-emitting device 81 includes a substrate 140 including the mounting substrate 20a and a circuit substrate 140b as well as a wiring 125. A configuration and a function of components of the planar light-emitting device 81 except a linear light-emitter 104 and a light guide plate 35 are the same as those of the components of the planar light-emitting device 1 that are given the same signs, so that a detailed description is omitted.

The linear light-emitter 104 differs from the linear light-emitter 2 in that the linear light-emitter 104 includes, instead of the substrate 20, the substrate 140 including the mounting substrate 20a and the circuit substrate 140b. A configuration and a function of the linear light-emitter 104 except the substrate 140 are the same as those of the linear light-emitter 2, so that a detailed description is omitted.

The circuit substrate 140b differs from the circuit substrate 20b in that an opening serving as a single mounting region 21c is formed. A configuration and a function of the circuit substrate 140b except that the mounting region 21c is formed are the same as those of the circuit substrate 20b, so that a detailed description is omitted.

The light-emitting elements 24 are arranged in a single row in the longitudinal direction of the substrate 140 at a center 601 of the mounting region 21c, and in two rows in the longitudinal direction of the substrate 140 at ends 602 and 603 of the mounting region 21c. The light-emitting elements 24 are arranged at a uniform arrangement interval $D_1$ in the longitudinal direction of the substrate 140 at a center 601 of the mounting region 21c and each of the ends 602 and 603.

The light guide plate 35 differs from the light guide plate 3 in that the protrusion 33 is arranged only at both ends of the light incident surface 31 in the longitudinal direction rather than at a center. A configuration and a function of the light guide plate 35 except the arrangement position of the protrusion 33 are the same as those of the light guide plate 3, so that a detailed description is omitted.

In the planar light-emitting device 81, the light-emitting elements 24 are arranged in a single row in the longitudinal direction of the substrate 140 at the center of the mounting region 21c, and in two rows in the longitudinal direction of the substrate 140 at an end of the mounting region 21c. The light-emitting elements 24 are arranged in two rows at an end of the first mounting region 21c where a luminance drops due to interference with the protrusion 33 of the light guide plate 3. It is thus possible to cover the drop in the luminance due to the protrusion 33 and accordingly emit light having a more uniform luminance.

When the light-emitting elements 24 are arranged in a single mounting region in a linear light-emitter as in the fifth variation, the light-emitting elements 24 may be arranged so that an arrangement interval at an end of a mounting region will be narrower than that at a center of the mounting region, in a similar way to the linear light-emitter 101 according to the second variation.

In addition, when the light-emitting elements 24 are arranged in a single mounting region in a linear light-emitter, the light-emitting elements 24 mounted at an end of the mounting region may be arranged so that their optical axis will be located at a more distant position from the light outgoing surface 32 than the optical axis of a light guide plate 36, in a similar way to the linear light-emitter 102 according to the third variation.

In addition, when the light-emitting elements 24 are arranged in a single mounting region in a linear light-emitter, the light-emitting elements 24 mounted at an end of the mounting region may be arranged so that their optical axis will be located at a position closer to the light outgoing surface 32 than the optical axis of the light guide plate 36, in a similar way to the linear light-emitter 103 according to the fourth variation.

In addition, in a planar light-emitting device according to an embodiment, a luminance of a region adjacent to the protrusion 33 and an end of the light guide plate 35 may be increased by way of another mode.

Figure 11:
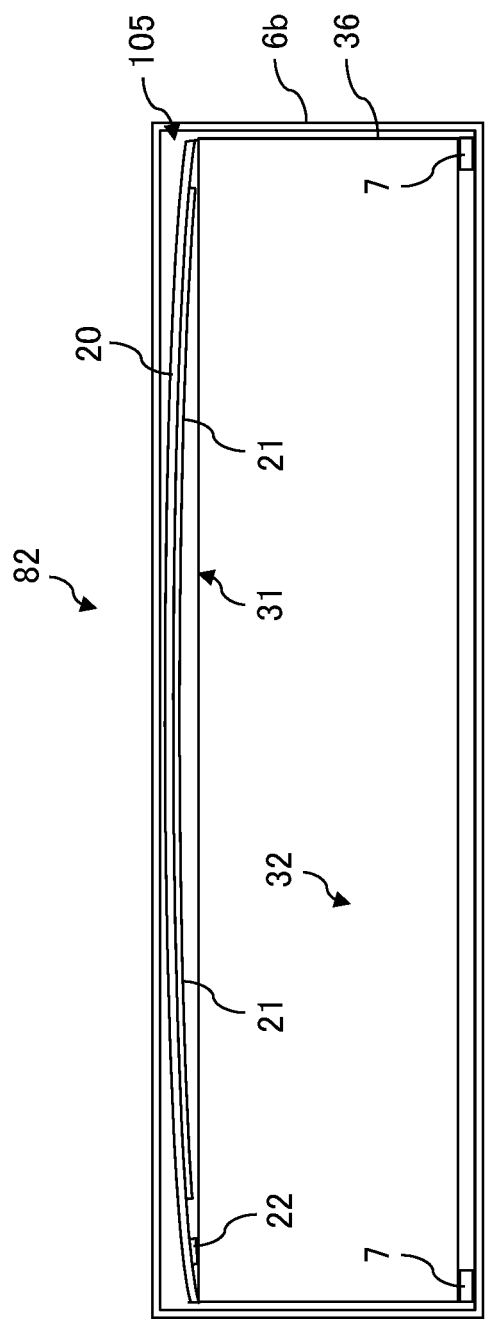
FIG. 11 is a perspective plan view of a planar light-emitting device including a linear light-emitter according to a sixth variation.
Figure 12:
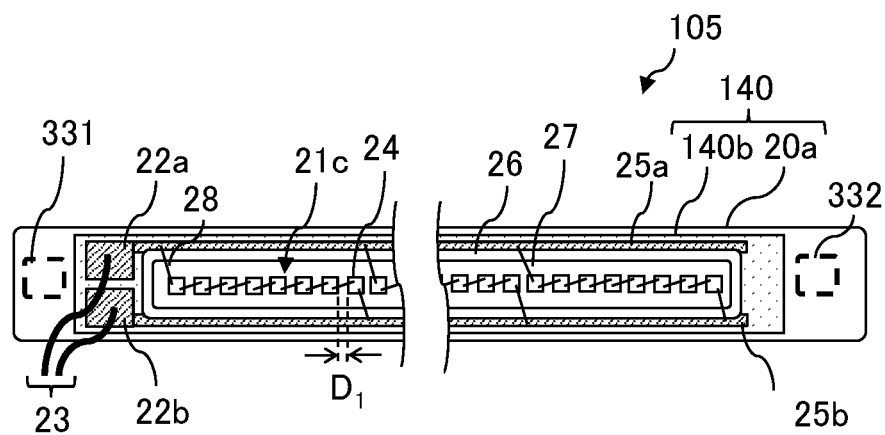
FIG. 12 is an enlarged plan view of the linear light-emitter according to the sixth variation.

FIG. 11 is a perspective plan view of a planar light-emitting device including a linear light-emitter according to a sixth variation. FIG. 12 is an enlarged plan view of the linear light-emitter according to the sixth variation.

A planar light-emitting device 82 differs from the planar light-emitting device 81 in that the planar light-emitting device 82 includes, instead of the linear light-emitter 104 and the light guide plate 35, a linear light-emitter 105 and a light guide plate 36. A configuration and a function of the planar light-emitting device 82 except the linear light-emitter 105 and the light guide plate 36 are the same as those of the planar light-emitting device 81 that are given the same signs, so that a detailed description is omitted.

The linear light-emitter 105 differs from the linear light-emitter 104 that the light-emitting elements 24 are arranged in a single row from one end to the other end of the mounting region 21c in the longitudinal direction of the linear light-emitter 105. A configuration and a function of the linear light-emitter 105 except the arrangement shape of the light-emitting elements 24 are the same as those of the linear light-emitter 104, so that a detailed description is omitted.

The light-emitting elements 24 are arranged in a single row in the longitudinal direction of the substrate 140 at the center 501 of the mounting region 21c and at each of the ends 602 and 603 of the mounting region 21c. The light-emitting elements 24 are arranged at a uniform arrangement interval $D_1$ in the longitudinal direction of the substrate 140 at each of the center 601, the end 602 and the end 603 of the mounting region 21c.

The light guide plate 36 differs from the light guide plate 35 in that the protrusion 33 is not arranged at either end of the light incident surface 31 in its longitudinal direction. A configuration and a function of the light guide plate 36 except the arrangement position of the protrusion 33 are the same as those of the light guide plate 35, so that a detailed description is omitted.

The linear light-emitter 105 is curved while a rear surface of the center thereof is fixed to a lateral portion of the lower case 6b and both ends of the linear light-emitter 105 are lifted up by a fixed member (not illustrated) or the like to separate the both ends from the lateral portion of the lower case 6b. Thinning of a wiring material can reduce the rigidity of the wiring thus facilitating deformation. Partial thinning results in a shape with corners such as a folded shape. Thinning over a wide range provides a curved shape. The linear light-emitter 105 has a center fixed to the lateral portion of the lower case 6b and both ends separated from the lifted lateral portion of the lower case 6b, thereby reducing a distance between the both ends and the light incident surface 31 of the light guide plate 36 to be shorter than that between the center and the light incident surface 31 of the light guide plate 36.

In the planar light-emitting device 82, the distance between both ends of the linear light-emitter 105 and the light incident surface 31 of the light guide plate 36 is shorter than that between the center and the light incident surface 31 of the light guide plate 36. This configuration prevents a luminance of both ends of the light guide plate 36 from dropping to below that at the center of the light guide plate 36.

Figure 13:
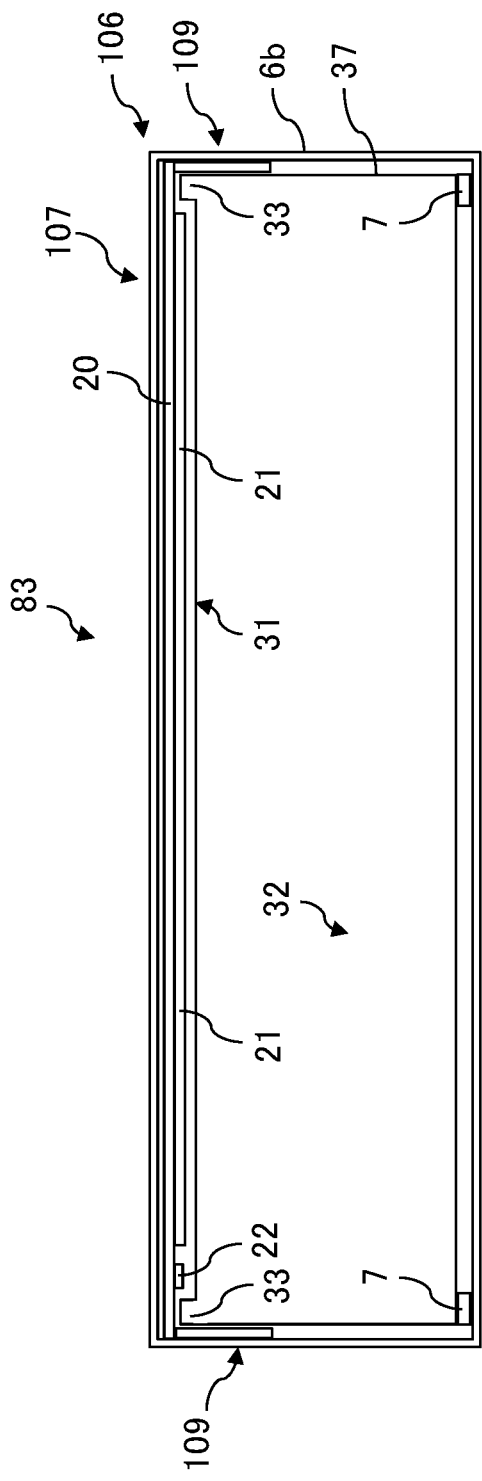
FIG. 13 is a perspective plan view of a planar light-emitting device including a linear light-emitter according to a seventh variation.
Figure 14:
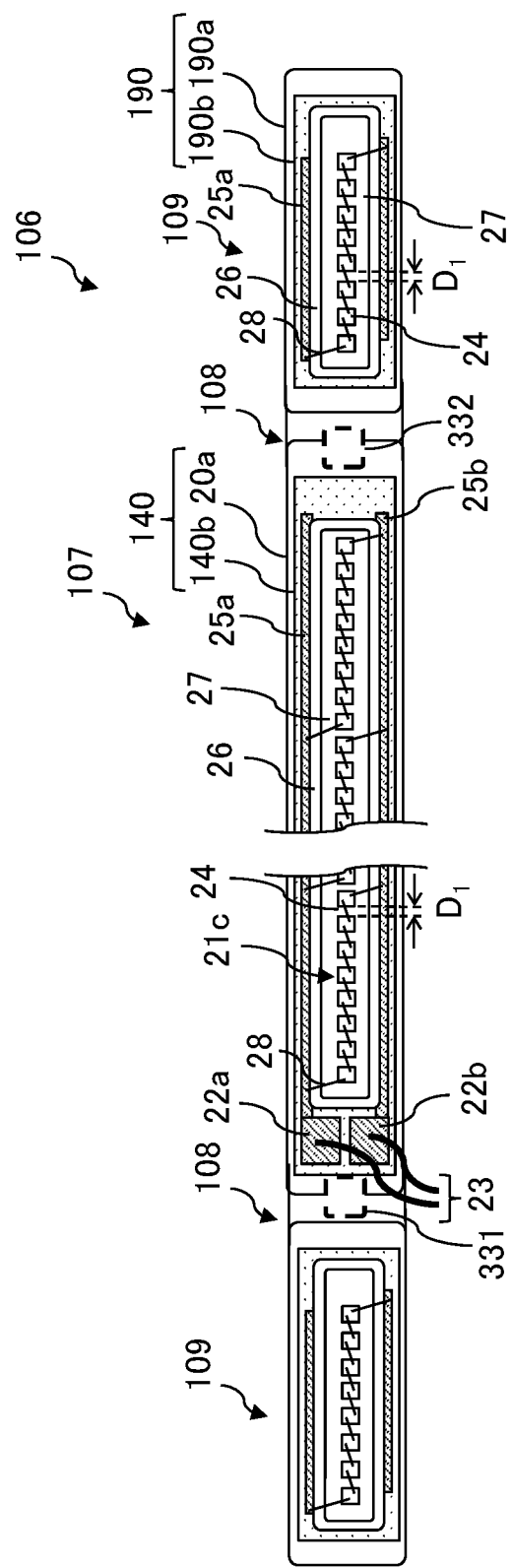
FIG. 14 is an enlarged plan view of the linear light-emitter according to the seventh variation.

FIG. 13 is a perspective plan view of a planar light-emitting device including a linear light-emitter according to a seventh variation. FIG. 14 is an enlarged plan view of the linear light-emitter according to the seventh variation.

A planar light-emitting device 83 differs from planar light-emitting device 81 in that the planar light-emitting device 83 includes, instead of the linear light-emitter 104 and the light guide plate 35, a linear light-emitter 106 and a light guide plate 37. A configuration and a function of the planar light-emitting device 83 except the linear light-emitter 106 and the light guide plate 37 are the same as those of the planar light-emitting device 81 that are given the same signs, so that a detailed description is omitted.

The linear light-emitter 106 includes a main linear light-emitter 107, a pair of connection substrates 108 and a pair of sub linear light-emitters 109. The linear light-emitter 107 has a configuration and a function that are similar to those of the linear light-emitter 105 according to the sixth variation, so that each one of the pair of connection substrates 108 is a flexible circuit substrate such as a flexible board and feeds electric power supplied from the main linear light-emitter 107 to each one of the pair of sub linear light-emitters 109. A connection substrate 108 including a mounting substrate has a high heat dissipation property. On the other hand, a connection substrate 108 without a mounting substrate bends easily.

The pair of sub linear light-emitters 109 includes a substrate 190 including a mounting substrate 190a and a circuit substrate 190b. Electric power supplied via each one of the pair of connection substrates 108 electrically connects the eight light-emitting elements 24 to the wiring 25 via the wire 28. While the number of light-emitting elements 24 is appropriately determined in accordance with an output voltage of a drive circuit, the number of light-emitting elements 24 in series is preferably the same as the number of main linear light-emitters 107, because of matching of a performance between them. The pair of sub linear light-emitter 109 is fixed to a lateral portion orthogonal to the lateral portion of the lower case 6b to which the main linear light-emitter 107 is fixed.

The light guide plate 37 differs from the light guide plate 35 in that the light guide plate 37 has a short length in a longitudinal direction because the pair of sub linear light-emitters 109 is arranged. A configuration and a function of the light guide plate 37 except a short length in a longitudinal direction are the same as those of the light guide plate 35, so that a detailed description is omitted.

In the planar light-emitting device 83, light emitted from an end of the main linear light-emitter 107 and the pair of sub linear light-emitters 109 is incident on the ends of the light guide plate 37. This configuration prevents a luminance of both ends of the light guide plate 37 from dropping to below that at the center of the light guide plate 37.

While linear light-emitters are connected in a straight line in the planar light-emitting device according to the seventh variation, linear light-emitters need not be connected in a straight line in a planar light-emitting device according to an embodiment.

Figure 15:
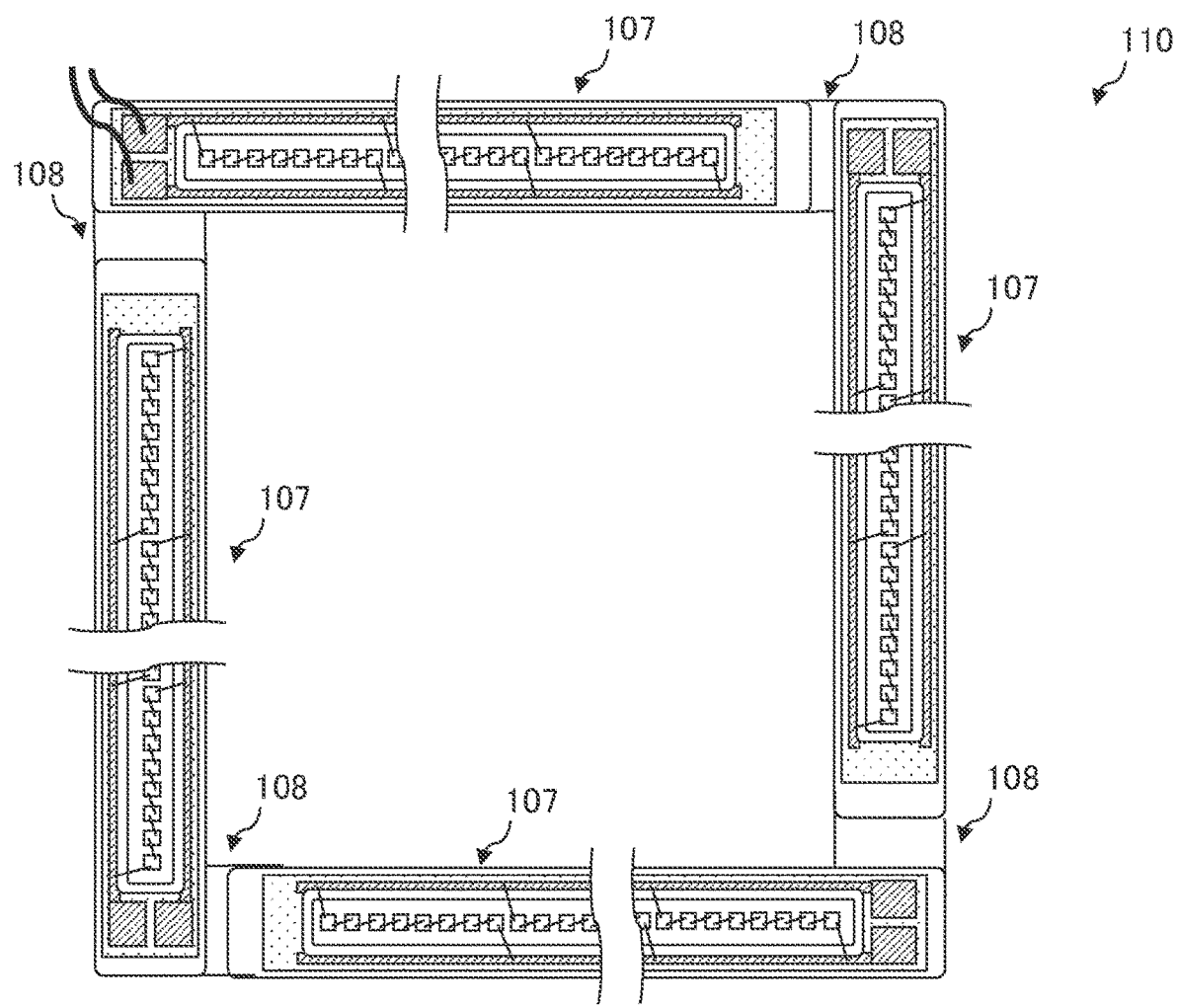
FIG. 15 is an enlarged plan view of a linear light-emitter according to an eighth variation.
Figure 16:
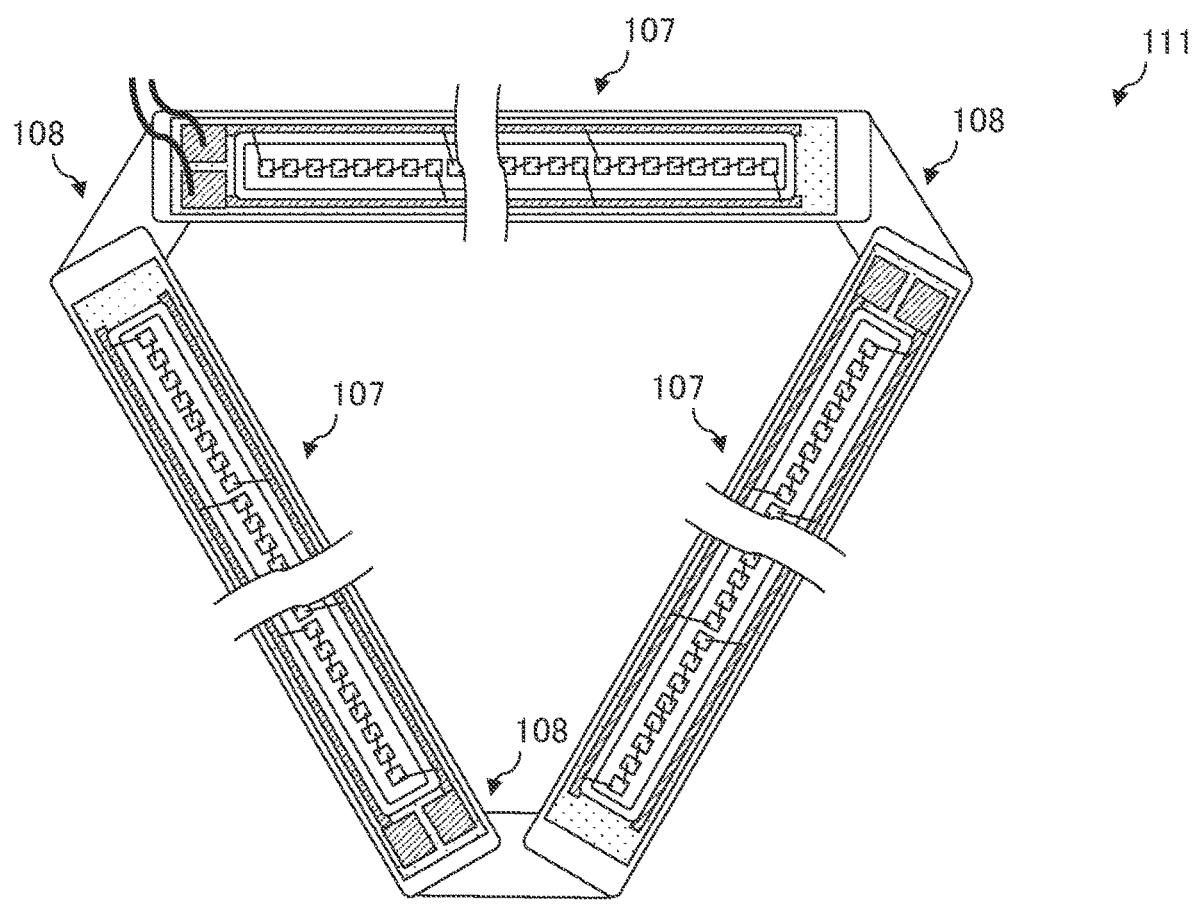
FIG. 16 is an enlarged plan view of a linear light-emitter according to a ninth variation.

FIG. 15 is an enlarged plan view of a linear light-emitter according to an eighth variation. FIG. 16 is an enlarged plan view of a linear light-emitter according to a ninth variation.

A linear light-emitter 110 according to the eighth variation includes four main linear light-emitters 107 arranged so as to have a rectangular planar shape via the connection substrate 108. The four main linear light-emitters 107 are electrically interconnected via the connection substrate 108.

A linear light-emitter 111 according to the ninth variation includes three main linear light-emitters 107 arranged so as to have a triangular planar shape via the connection substrate 108. The three main linear light-emitters 107 are electrically interconnected via the connection substrate 108.

The linear light-emitter 110 according to the eighth variation or the linear light-emitter 111 according to the ninth variation includes the main linear light-emitters 107 arranged so as to have a rectangular or triangular planar shape and may thus be used as a direct-type backlight light source. In the linear light-emitter 110 according to the eighth variation and the linear light-emitter 111 according to the ninth variation, a luminance of a specific part of a substrate is higher than that of the other parts of the substrate.

A linear light-emitter according to an embodiment may arrange the main linear light-emitter 107 in a planar shape except a triangle and a rectangle, such as a square well curb shape.

Figure 17E:
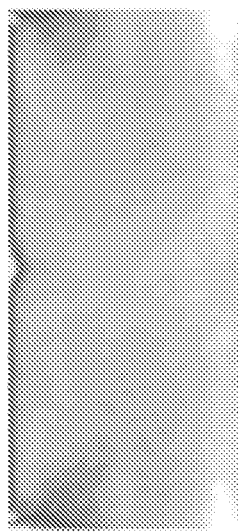
FIG. 17E illustrates an optical simulation result of the planar light-emitting device 82 according to the sixth variation.
Figure 17F:
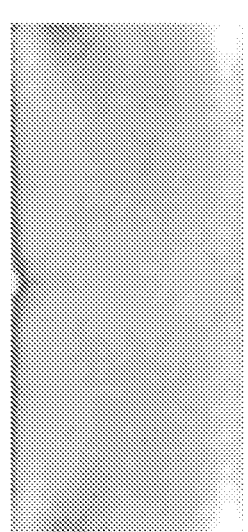
FIG. 17F illustrates an optical simulation result of the planar light-emitting device 83 according to the seventh variation.
Figure 17G:
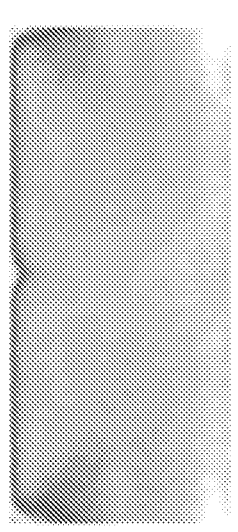
FIG. 17G illustrates an optical simulation result of a planar light-emitting device according to a comparative example.
Figure 17A:
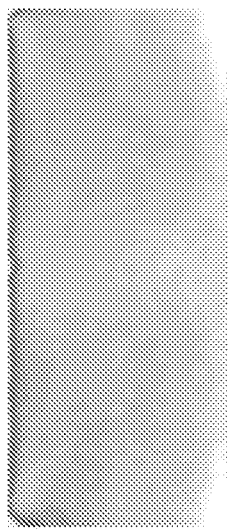
FIG. 17A illustrates an optical simulation result of the planar light-emitting device 1 according to an embodiment.
Figure 17B:
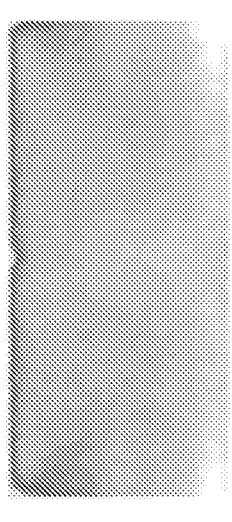
FIG. 17B illustrates an optical simulation result of a planar light-emitting device mounting the linear light-emitter 102 according to the second variation.
Figure 17C:
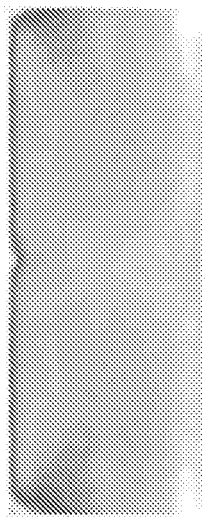
FIG. 17C illustrates an optical simulation result of a planar light-emitting device mounting the linear light-emitter 103 according to the third variation.
Figure 17D:
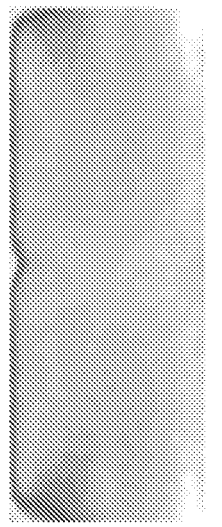
FIG. 17D illustrates an optical simulation result of a planar light-emitting device mounting the linear light-emitter 104 according to the fourth variation.

FIGS. 17A to 17G illustrates a planar light-emitting device according to an embodiment, a planar light-emitting device according to a variation and an optical simulation result of a planar light-emitting device according to a comparative example. FIG. 17A illustrates an optical simulation result of the planar light-emitting device 1 according to an embodiment. FIG. 17B illustrates an optical simulation result of a planar light-emitting device mounting the linear light-emitter 102 according to the second variation. FIG. 17C illustrates an optical simulation result of a planar light-emitting device mounting the linear light-emitter 103 according to the third variation. FIG. 17D illustrates an optical simulation result of a planar light-emitting device mounting the linear light-emitter 104 according to the fourth variation. FIG. 17E illustrates an optical simulation result of the planar light-emitting device 82 according to the sixth variation. FIG. 17F illustrates an optical simulation result of the planar light-emitting device 83 according to the seventh variation. FIG. 17G illustrates an optical simulation result of a planar light-emitting device according to a comparative example.

The simulation result illustrated in FIGS. 17A to 17G has been obtained via a simulation using LightTools from Cybernet Systems Co., Ltd. as a simulation model. The planar light-emitting device has a size of 12.3 inches and the light outgoing surface of the planar light-emitting type has a size of 293.8 mm×111.4 mm. The light guide plate has a thickness of 3.2 mm. The linear light-emitter has an LES 140.85 mm in size and has a shape of the so-called binocular type where two mounting regions are formed on a substrate 4.9 mm in width, and mounts 26 light-emitting rows connected in parallel, each of the rows being formed of eight light-emitting elements connected in series. The two mounting regions are each surrounded by a frame that is 0.95 mm in width. A light-emitting element mounted on the linear light-emitter is an LED 0.2 mm thick having a 0.65 mm square planar shape.

In a simulation corresponding to an embodiment as illustrated in FIG. 17A, light-emitting elements are mounted at a pitch of 1.342 mm in a longitudinal direction and an interval between a frame and a light-emitting element at an end of a mounting region is 0.325 mm. In addition, six light-emitting elements are mounted in two rows at an interval of 0.25 mm at an end of the mounting region.

In a simulation corresponding to an embodiment as illustrated in FIG. 17B, light-emitting elements are mounted in a mounting region at a pitch of 1.398 mm in a longitudinal direction and light-emitting elements are mounted at a pitch of 0.9 mm at an end of the mounting region.

In a simulation corresponding to the third variation as illustrated in FIG. 17C, light-emitting elements are mounted in a mounting region at a pitch of 1.342 mm in a longitudinal direction and six light-emitting elements are mounted with a center thereof shifted by 0.3 mm to below a center of a light guidance plate at an end of the mounting region.

In a simulation corresponding to the fourth variation as illustrated in FIG. 17D, light-emitting elements are mounted in a mounting region at a pitch of 1.342 mm in a longitudinal direction and six light-emitting elements are mounted with a center thereof shifted by 0.3 mm to above a center of a light guidance plate at an end of the mounting region.

In a simulation corresponding to the sixth variation as illustrated in FIG. 17E, concerning light-emitting elements mounted in a mounting region at a pitch of 1.342 mm in a longitudinal direction, a distance between a light-emitting element and a light guide plate is gradually changed starting with one end of a mounting region. A distance between a light-emitting element and the light guide plate is gradually increased, i.e. a distance is set to 0.01 mm, 0.078 mm, 0.146 mm, 0.214 mm, and 0.282 mm from one end of the mounting region, and afterwards a distance between a light-emitting element and the light guide plate is set to 0.35 mm up to the sixth light-emitting element from the other end.

In a simulation corresponding to the seventh variation as illustrated in FIG. 17F, light-emitting elements are mounted on a case at a pitch of 1.342 mm in a longitudinal direction and six light-emitting elements are mounted at a pitch of 1.342 mm in a region close to a light incident surface of a light guide plate on a short side of the case. A distance between a corner of the case and a light-emitting element is 12.474 mm on a long side and 2.675 mm on a short side.

In a simulation corresponding to the comparative example as illustrated in FIG. 17G, light-emitting elements are mounted in a mounting region at a pitch of 1.342 mm in a longitudinal direction.

In the simulation corresponding to an embodiment as illustrated in FIG. 17A, in comparison with the simulation corresponding to the comparative example as illustrated in FIG. 17G, it is confirmed via an optical simulation that a luminance is higher by 41 to 46% at both ends and a center of a light guide plate.

In the simulation corresponding to the second variation as illustrated in FIG. 17B, in comparison with the simulation corresponding to the comparative example as illustrated in FIG. 17G, it is confirmed via an optical simulation that a luminance is higher by 13 to 19% at both ends and a center of a light guide plate.

In the simulation corresponding to the third variation as illustrated in FIG. 17C, in comparison with the simulation corresponding to the comparative example as illustrated in FIG. 17G, it is confirmed via an optical simulation that a luminance is higher by 1 to 2% at both ends and a center of a light guide plate.

In the simulation corresponding to the fourth variation as illustrated in FIG. 17D, in comparison with the simulation corresponding to the comparative example as illustrated in FIG. 17G, it is confirmed via an optical simulation that a luminance is higher by 5 to 7% at both ends and a center of a light guide plate.

In the simulation corresponding to the sixth variation as illustrated in FIG. 17E, in comparison with the simulation corresponding to the comparative example as illustrated in FIG. 17G, it is confirmed via an optical simulation that a luminance is higher by 110 to 113% at both ends of a light guide plate.

In a simulation corresponding to the seventh variation as illustrated in FIG. 17F, in comparison with the simulation corresponding to the comparative example as illustrated in FIG. 17G, it is confirmed via an optical simulation that a luminance is higher by 111 to 115% at both ends of a light guide plate.

FIGS. 18A to 18D illustrates a measurement result of a luminance distribution of a backlight device including, as a light source, multiple SMDs arranged in a straight line and a backlight device including, as a light source, a linear light-emitter according to the disclosure. FIG. 18A is an image of luminance distribution of the backlight device including SMDs as a light source. FIG. 18B is a graph of a luminance distribution of the backlight device including SMDs as a light source. FIG. 18C is an image of a luminance distribution of the linear light-emitter according to the disclosure. FIG. 18D is a graph of a luminance distribution of the backlight device including the linear light-emitter as a light source. In FIGS. 18B and 18D, a horizontal axis indicates a position of a light-emitting region in a longitudinal direction and a vertical axis indicates a luminance.

In a simulation illustrated in FIGS. 18A to 18D, a luminance distribution at a position separated by 500 mm from a light-emitting element observed when a forward current of 80 mA is fed to each LED by using a 2D spectroradiometer SR-5000-HWS from TOPCON TECHNOHOUSE CORPORATION. In a backlight device including SMDs as a light source, white LEDs (CL-A131-1W4) from CITIZEN ELECTRONICS CO., LTD. are arranged at a pitch of 8.2 mm.

In a backlight device including SMDs as a light source, while a high luminance is obtained just above an SMD mounted on the substrate 20 arranged on the light guide plate 3, a luminance drops to approximately zero between SMDs, meaning that a luminance just above an SMD differs from that between SMDs. In a backlight device including SMDs as a light source, light emitted from a light source has a non-uniform luminance in which a luminance just above an SMD differs from that between SMDs.

In a backlight device including, as a light source, a linear light-emitter according to the disclosure, a luminance of a part adjacent to either end of a light-emitting region in a longitudinal direction is higher than that of the other parts. In addition, it is confirmed that a luminance of a center of a light-emitting region is the same and a backlight device including, as a light source, a linear light-emitter according to the disclosure emits light having a uniform luminance.

Figure 19:
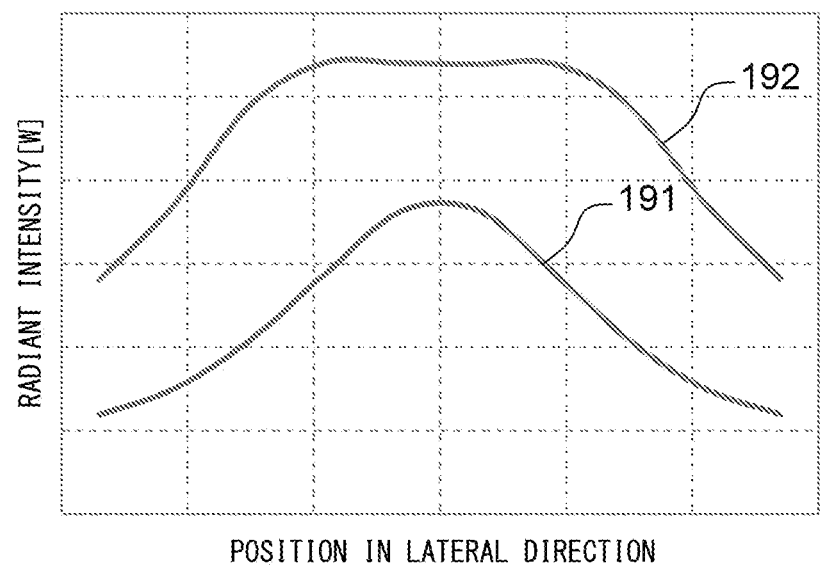
FIG. 19 is illustrates a relation between an element arrangement of a linear light-emitter 2 according to an embodiment and a radiant intensity.

FIG. 19 illustrates a relation between an element arrangement of a linear light-emitter 2 according to an embodiment and a radiant intensity. In FIG. 19, a horizontal axis indicates a position in a lateral direction and a vertical axis indicates a radiant intensity. In addition, a curve 191 indicates a radiant intensity observed when a single light-emitting element 24 is arranged in a lateral direction, and a curve 192 indicates a radiant intensity observed when two light-emitting elements 24 are arranged in the lateral direction.

A maximum value of the curve 192 indicating a radiant intensity observed when two light-emitting elements 24 are arranged in the lateral direction is approximately 1.5 times that of the curve 191 indicating a radiant intensity observed when a single light-emitting element 24 is arranged in the lateral direction. In a linear light-emitter 2, a radiant intensity can be increased by increasing the number of the light-emitting elements 24 arranged in a lateral direction while keeping constant a length of a light-emitting region in a lateral direction. When an SMD is mounted as a light-emitting element, increasing the number of light-emitting elements mounted in a lateral direction increases a length of a light-emitting region in a lateral direction, so that an emission intensity per unit area is not increased.

From another point of view, a planar light-emitting device according to the disclosure includes:
- a linear light-emitter including:
  - a substrate extending in a predetermined direction;
  - multiple light-emitting elements arranged on the substrate in the predetermined direction; and
  - a seal arranged inside a frame in order to seal the multiple light-emitting elements;
- a light guide plate including a light incident surface for receiving light emitted from the linear light-emitter, a protrusion arranged on the light incident surface, and a light outgoing surface for emitting light incident on the light incident surface; and
- a case for accommodating the linear light-emitter and the light guide plate so that a light-emitting region of the linear light-emitter will be opposed to the light incident surface of the light guide plate and that the protrusion of the light guide plate will make contact with the linear light-emitter,
- wherein the multiple light-emitting elements are arranged uniformly, in a region separated from an end of the linear light-emitter, at a first arrangement pitch in the predetermined direction, and arranged uniformly, in a region adjacent to the end of the linear light-emitter, at a second wiring pitch that is narrower than the first arrangement pitch in the predetermined direction.

Further, in a planar light-emitting device, multiple light-emitting elements are preferably arranged in a single row in a predetermined direction.

In addition, from another point of view, a planar light-emitting device according to the disclosure includes:
- a linear light-emitter including:
  - a substrate extending in a predetermined direction;
  - multiple light-emitting elements arranged on the substrate in the predetermined direction;
  - a frame arranged on the substrate so as to surround the multiple light-emitting elements; and
  - a seal arranged inside the frame in order to seal the multiple light-emitting elements;
- a light guide plate including a light incident surface for receiving light emitted from the linear light-emitter, a protrusion arranged on the light incident surface, and a light outgoing surface for emitting light incident on the light incident surface; and
- a case for accommodating the linear light-emitter and the light guide plate so that a light-emitting region of the linear light-emitter will be opposed to the light incident surface of the light guide plate and that the protrusion of the light guide plate will make contact with the linear light-emitter,
- wherein the multiple light-emitting elements are arranged, in a region separated from an end of the linear light-emitter, so that their optical axis will match that of the light guide plate, and are arranged, in a region adjacent to the end of the linear light-emitter, so that their optical axis will be arranged deviated from that of the light guide plate in a height direction of the light incident surface.

Further, in a planar light-emitting device, the multiple light-emitting elements are preferably arranged, in a region adjacent to an end of the linear light-emitter, so that their optical axis will be located at a position closer to the light outgoing surface than the optical axis of the light guide plate.

Further, in a planar light-emitting device, the multiple light-emitting elements are preferably arranged, in a region adjacent to an end of the linear light-emitter, so that their optical axis will be located at a more distant position from the light outgoing surface than the optical axis of the light guide plate.

Further, in a planar light-emitting device, the multiple light-emitting elements are preferably arranged in a single row in a predetermined direction.

In addition, from another point of view, a planar light-emitting device according to the disclosure includes:
- a linear light-emitter including:
  - a substrate extending in a predetermined direction;
  - multiple light-emitting elements arranged on the substrate in the predetermined direction;
  - a frame arranged on the substrate so as to surround the multiple light-emitting elements; and
  - a seal arranged inside the frame in order to seal the multiple light-emitting elements;
- a light guide plate including a light incident surface for receiving light emitted from the linear light-emitter and a light outgoing surface for emitting light incident on the light incident surface; and
- a case for accommodating the linear light-emitter and the light guide plate so that a light-emitting region of the linear light-emitter will be opposed to the light incident surface of the light guide plate;
- wherein the linear light-emitter is arranged while being curved so that a distance between either end thereof and the light incident surface will be shorter than that between a center and the light incident surface.

In addition, from another point of view, a planar light-emitting device according to the disclosure includes:
- a first linear light-emitter, a second linear light-emitter and a third linear light-emitter each including:
  - a substrate extending in a predetermined direction;
  - multiple light-emitting elements arranged on the substrate in the predetermined direction;
  - a frame arranged on the substrate so as to surround the multiple light-emitting elements; and
  - a seal arranged inside the frame in order to seal the multiple light-emitting elements; and
- a case for accommodating the linear light-emitter, the second linear light-emitter and the third linear light-emitter so that a light-emitting region of the first linear light-emitter will be opposed to the light incident surface of the light guide plate and that the protrusion of the light guide plate will make contact with the linear light-emitter,
- wherein the second linear light-emitter and the third linear light-emitter are arranged so that one end thereof will be arranged adjacent to the first linear light-emitter.

What is claimed is:

1. A linear light-emitting device comprising:
   a substrate having a planar mounting region and extending in a predetermined direction;
   a plurality of light-emitting elements arranged on the mounting region of the substrate in a predetermined direction; and
   a seal for integrally sealing the plurality of light-emitting elements,
   wherein a luminance of a specific part of the substrate is higher than that of other parts of the substrate, and
   wherein the plurality of light-emitting elements are arranged, in a region separated from an end of a linear light-emitter, so that their optical axis will match that of a light guide plate, and are arranged, in a region adjacent to the end of the linear light-emitter, so that their optical axis will be arranged deviated from that of the light guide plate in a height direction of a light incident surface.

2. A linear light-emitting device comprising:
a substrate extending in a predetermined direction on which a planar mounting region extending in the predetermined direction are formed;
a plurality of light-emitting elements solely arranged on the mounting region in the predetermined direction; and
a seal arranged for sealing the plurality of light-emitting elements,
wherein a luminance of a specified part of the substrate is 1.1 times or more higher than that of other parts of the substrate, and
wherein the plurality of light-emitting elements are arranged in a single row or in a plurality of rows in a longitudinal direction at a center of the mounting region, and are arranged, in a number of rows greater than the number of rows arranged at the center, in the longitudinal direction, in a region adjacent to an end of the mounting region.

3. The linear light-emitting device according to claim 1, further comprising a member for suppressing a curving of the substrate.

4. The linear light-emitting device according to claim 2, wherein the mounting region has substantially a same shape irrespective of the number of rows of the light-emitting elements.

5. The linear light-emitting device according to claim 1, wherein the mounting region includes a first mounting region extending in the predetermined direction and a second mounting region extending in the predetermined direction and arranged adjacent to the first mounting region in the predetermined direction.

6. The linear light-emitting device according to claim 1, wherein the mounting region is not formed in a power source unit for supplying electric power to the plurality of light-emitting elements.

7. The linear light-emitting device according to claim 1, further comprising a frame for controlling light coming from the light-emitting element.

8. The linear light-emitting device according to claim 2, wherein the plurality of light-emitting elements are arranged at a uniform arrangement interval in the predetermined direction.

9. A linear light-emitting device comprising:
a substrate having a planar mounting region and extending in a predetermined direction;
a plurality of light-emitting elements arranged on the mounting region of the substrate in a predetermined direction; and
a seal for integrally sealing the plurality of light-emitting elements,
wherein a luminance of a specific part of the substrate is higher than that of other parts of the substrate, and
wherein the plurality of light-emitting elements are arranged uniformly, in a region separated from an end of a linear light-emitter, at a first arrangement pitch in the predetermined direction, and arranged uniformly, in a region adjacent to the end of the linear light-emitter, at a second wiring pitch that is narrower than the first arrangement pitch in the predetermined direction.

10. The linear light-emitting device according to claim 9, further comprising a member for suppressing a curving of the substrate.

11. The linear light-emitting device according to claim 9, further comprising a frame for controlling light coming from the light-emitting element.

12. A linear light-emitting device comprising:
a substrate having a planar mounting region and extending in a predetermined direction;
a plurality of light-emitting elements arranged on the mounting region of the substrate in a predetermined direction; and
a seal for integrally sealing the plurality of light-emitting elements,
wherein a luminance of a specific part of the substrate is higher than that of other parts of the substrate, and
wherein two or more of the light-emitting elements are mounted on the specific part, and two or more of the light-emitting elements are mounted on the other parts.

13. The linear light-emitting device according to claim 2, further comprising a member for suppressing a curving of the substrate.

14. The linear light-emitting device according to claim 2, further comprising a frame for controlling light coming from the light-emitting element.

15. A linear light-emitting device comprising:
a substrate extending in a predetermined direction on which a planar mounting region extending in the predetermined direction are formed;
a plurality of light-emitting elements solely arranged on the mounting region in the predetermined direction; and
a seal arranged for sealing the plurality of light-emitting elements,
wherein a luminance of a specified part of the substrate is 1.1 times or more higher than that of other parts of the substrate, and
wherein two or more of the light-emitting elements are mounted on a specific part, and two or more of the light-emitting elements are mounted on the other parts.

\* \* \* \* \*